(12) United States Patent
Hui et al.

(10) Patent No.: US 11,768,522 B2
(45) Date of Patent: Sep. 26, 2023

(54) METHOD AND SYSTEM FOR DETECTING THE PRESENCE OR ABSENCE OF A PROTECTIVE CASE ON AN ELECTRONIC DEVICE

(71) Applicant: World Wide Warranty Life Services Inc., Port Moody (CA)

(72) Inventors: Richard Hui, Port Moody (CA); Anthony Daws, Vancouver (CA); Ebrahim Bagheri, Toronto (CA); Fattane Zarrinkalam, Toronto (CA); Hossein Fani, Toronto (CA); Samad Paydar, Toronto (CA)

(73) Assignee: World Wide Warranty Life Services Inc., Port Moody (CA)

( * ) Notice: Subject to any disclaimer, the term of this patent is extended or adjusted under 35 U.S.C. 154(b) by 0 days.

(21) Appl. No.: 17/769,895

(22) PCT Filed: Oct. 19, 2020

(86) PCT No.: PCT/CA2020/051401
§ 371 (c)(1),
(2) Date: Apr. 18, 2022

(87) PCT Pub. No.: WO2021/072557
PCT Pub. Date: Apr. 22, 2021

(65) Prior Publication Data
US 2022/0365564 A1 Nov. 17, 2022

Related U.S. Application Data

(60) Provisional application No. 62/923,098, filed on Oct. 18, 2019.

(51) Int. Cl.
*G06F 1/16* (2006.01)
*G06F 3/16* (2006.01)

(52) U.S. Cl.
CPC .......... *G06F 1/1656* (2013.01); *G06F 1/1694* (2013.01); *G06F 3/167* (2013.01); *G06F 2200/1633* (2013.01)

(58) Field of Classification Search
CPC .... G06F 1/1656; G06F 1/1684; G06F 1/1694; G06F 2200/1633
See application file for complete search history.

(56) References Cited

U.S. PATENT DOCUMENTS 6,098,460 A 8/2000 Otsuchi et al.
6,227,361 B1 * 5/2001 Salazar ................. A45C 11/00
224/666

(Continued)

FOREIGN PATENT DOCUMENTS

CN 108307053 A 7/2018
CN 108775915 A 11/2018

(Continued)

OTHER PUBLICATIONS

International Search Report and Written Opinion dated Dec. 29, 2020 in International Patent Application No. PCT/CA2020/051401 (9 pages).

(Continued)

*Primary Examiner* — Adrian S Wilson
(74) *Attorney, Agent, or Firm* — BERESKIN & PARR LLP/S.E.N.C.R.L. s.r.l; Tonino Rosario Orsi

(57) ABSTRACT

Various embodiments for the automatic detection of the presence of a protective case on an electronic device are provided herein. Generally, the electronic device includes one or more sensors; a device memory storing an application; a device processor, which upon execution of the application, is configured to: monitor, via at least one first sensor, a trigger condition for detecting the presence of the protective case; detect the trigger condition; in response to detecting the trigger condition, cause the electronic device to (Continued)

vibrate for a pre-determined period of time; collect, via at least one second sensor, sensor data during the pre-determined time; extract at least one feature from the sensor data; based on the extracted at least one feature, determine whether the protective case is applied to the electronic device; and generate an output indicating whether the protective case is applied to the electronic device.

20 Claims, 19 Drawing Sheets

(56) References Cited

U.S. PATENT DOCUMENTS

| | | | |
|---|---|---|---|
| 6,453,266 | B1 | 9/2002 | Chainer et al. |
| 6,570,503 | B1 | 5/2003 | Ulert et al. |
| 6,603,620 | B1 | 8/2003 | Berding |
| 6,698,272 | B1 | 3/2004 | Almirante |
| 6,864,790 | B2 | 3/2005 | Nishihara et al. |
| 7,191,089 | B2 | 3/2007 | Clifford et al. |
| 7,275,412 | B2 | 10/2007 | Nishihara et al. |
| 7,493,818 | B2 | 2/2009 | Nishihara et al. |
| 8,028,643 | B2 | 10/2011 | Pan et al. |
| 8,061,182 | B2 | 11/2011 | Weber et al. |
| 8,131,252 | B2 | 3/2012 | Soh et al. |
| 8,421,763 | B2 | 4/2013 | Liao |
| 9,326,404 | B1 | 4/2016 | Wood et al. |
| 9,548,275 | B2 | 1/2017 | Ayotte et al. |
| 9,618,421 | B2 | 4/2017 | Sanchez et al. |
| 9,640,057 | B1 | 5/2017 | Ross |
| 9,885,672 | B2 | 2/2018 | Forutanpour et al. |
| 9,939,314 | B2 | 4/2018 | Kaneko et al. |
| 10,101,772 | B2 | 10/2018 | Aurongzeb et al. |
| 10,140,617 | B2 | 11/2018 | Argue et al. |
| 10,834,543 | B2 * | 11/2020 | Xia .................... H04W 12/0431 |
| 11,445,986 | B2 | 9/2022 | Tudor |
| 2003/0151517 | A1 | 8/2003 | Nishihara et al. |
| 2005/0222801 | A1 | 10/2005 | Wulff et al. |
| 2005/0270700 | A1 | 12/2005 | Matsumoto |
| 2008/0001607 | A1 | 1/2008 | Horiguchi et al. |
| 2008/0129518 | A1 | 6/2008 | Carlton-Foss |
| 2008/0132196 | A1 * | 6/2008 | Soh .................... H04M 19/044 455/567 |
| 2008/0236282 | A1 | 10/2008 | Kim et al. |
| 2008/0243530 | A1 | 10/2008 | Stubler |
| 2009/0031803 | A1 | 2/2009 | Noda et al. |
| 2009/0316327 | A1 | 12/2009 | Mcnulty, Jr. |
| 2013/0193006 | A1 * | 8/2013 | Bergreen ............ H04B 1/3888 206/37 |
| 2013/0242505 | A1 | 9/2013 | Nguyen et al. |
| 2014/0149067 | A1 | 4/2014 | Merril et al. |
| 2014/0200054 | A1 | 7/2014 | Fraden |
| 2015/0106020 | A1 | 4/2015 | Chung et al. |
| 2015/0138135 | A1 * | 5/2015 | Gan .................... G06F 1/1692 345/174 |
| 2015/0263777 | A1 | 9/2015 | Fraden |
| 2015/0339736 | A1 | 11/2015 | Bennett |
| 2016/0054354 | A1 | 2/2016 | Keal et al. |
| 2016/0088476 | A1 * | 3/2016 | Park .................... H04W 12/06 455/411 |
| 2016/0269069 | A1 | 9/2016 | Fathollahi et al. |
| 2017/0108961 | A1 | 4/2017 | Thorstenson et al. |
| 2017/0123532 | A1 | 5/2017 | Zhao |
| 2017/0356857 | A1 * | 12/2017 | Forutanpour ............ G06T 7/13 |
| 2017/0372585 | A1 | 12/2017 | Iv Evangelista et al. |
| 2018/0167098 | A1 | 6/2018 | Armstrong |
| 2018/0174420 | A1 | 6/2018 | Clark et al. |
| 2018/0263534 | A1 | 9/2018 | Lee et al. |
| 2021/0217093 | A1 | 7/2021 | Fani et al. |
| 2022/0005341 | A1 * | 1/2022 | Hui ................. H04M 1/724092 |
| 2022/0087386 | A1 | 3/2022 | Wright et al. |
| 2022/0116494 | A1 | 4/2022 | Gaviola et al. |
| 2022/0365564 | A1 | 11/2022 | Hui et al. |
| 2022/0383625 | A1 * | 12/2022 | Hui .................... G06V 10/764 |

FOREIGN PATENT DOCUMENTS

| | | |
|---|---|---|
| EP | 1820031 B1 | 5/2012 |
| EP | 2267579 B1 | 8/2013 |
| EP | 2996351 A1 | 3/2016 |
| WO | 2017095034 A2 | 6/2017 |
| WO | 2018007100 A1 | 1/2018 |
| WO | 2021072557 A1 | 4/2021 |

OTHER PUBLICATIONS

International Search Report and Written Opinion dated Jan. 21, 2021 in International Patent Application No. PCT/CA2020/051413 (7 pages).

A. Mohan and S. Poobal "Crack detection using image processing: A critical review and analysis", in Alexandria Engineering Journal, vol. 57 issue 2, pp. 787-798, Jun. 2018.

International Search Report and Written Opinion dated Feb. 12, 2020 in International Patent Application No. PCT/CA2019/051590 (9 pages).

European Search Report dated Jul. 4, 2022 in European Patent Publication No. 3877728 (9 pages).

* cited by examiner

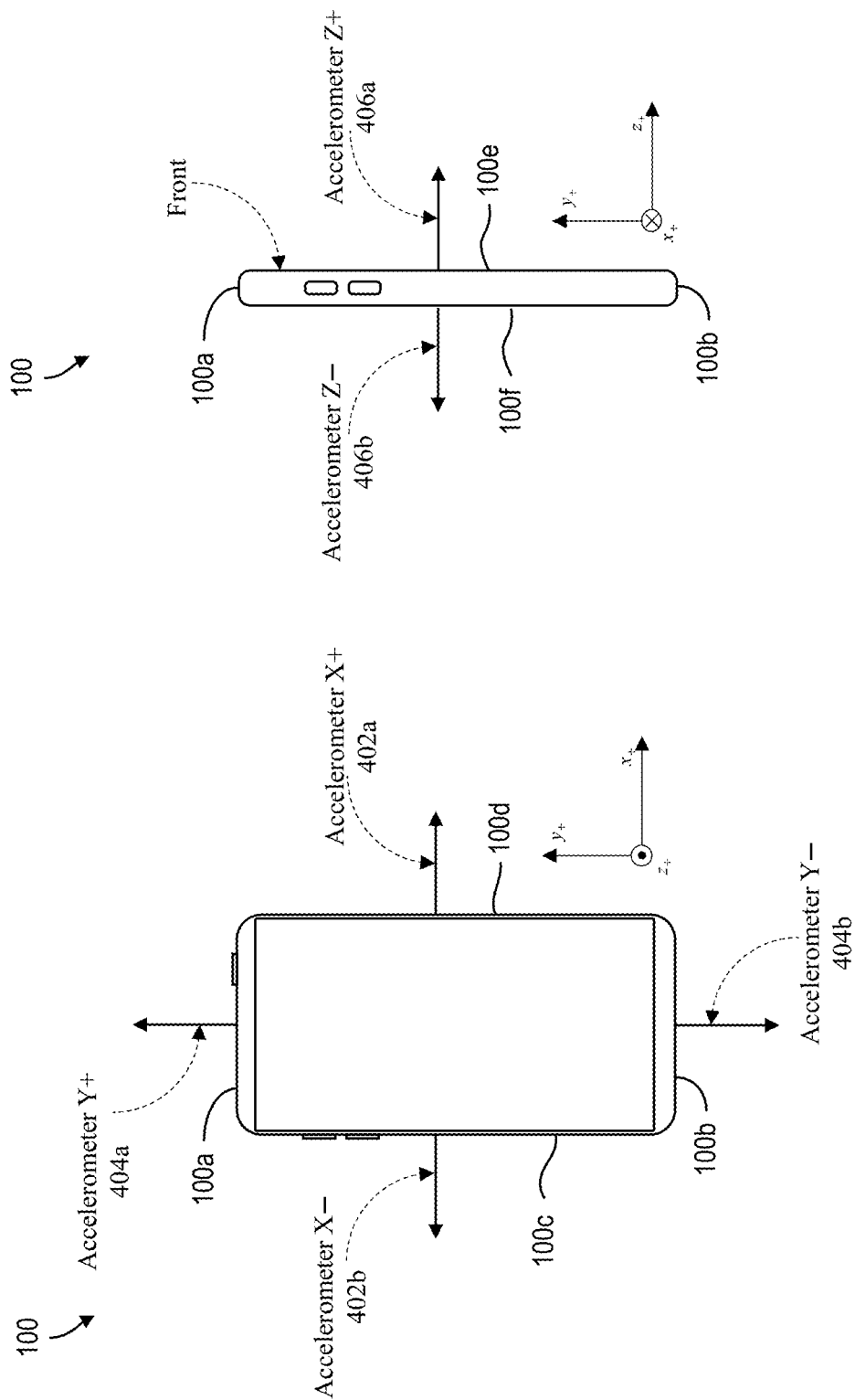

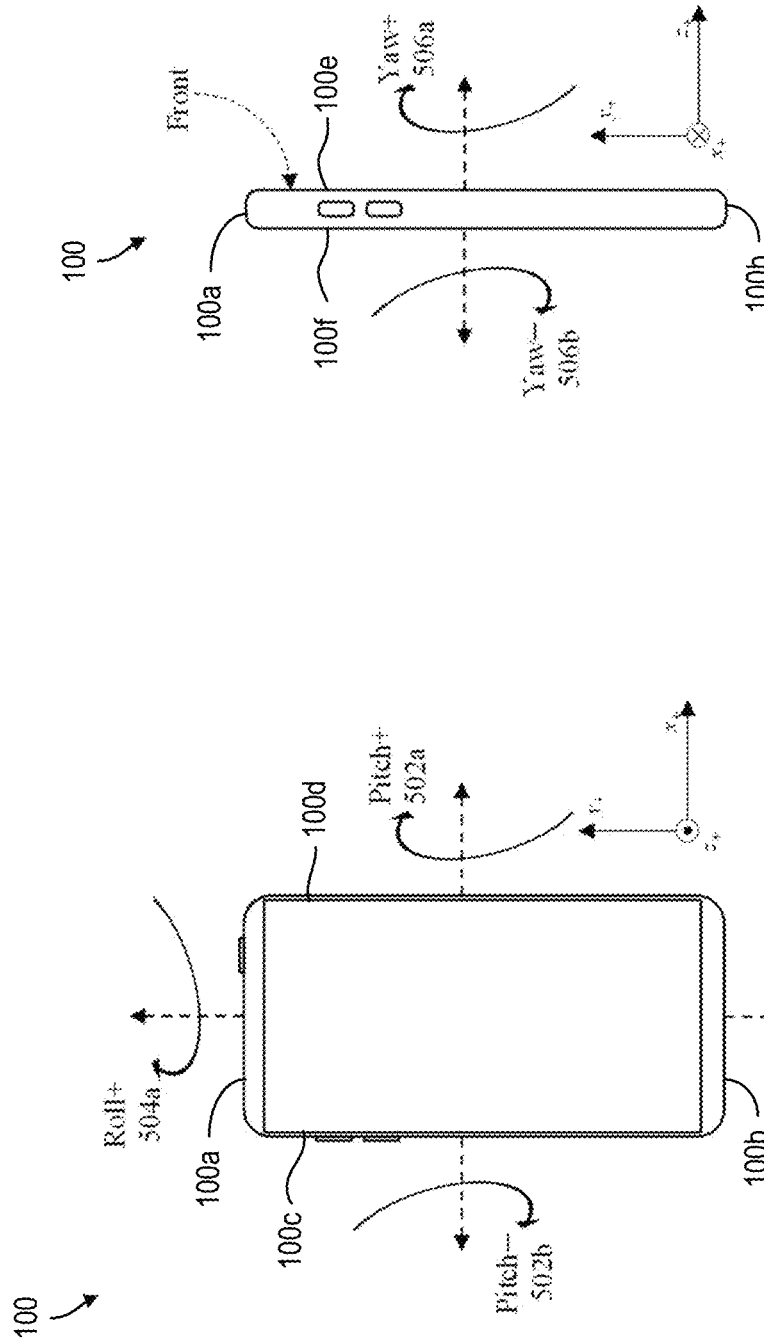

METHOD AND SYSTEM FOR DETECTING THE PRESENCE OR ABSENCE OF A PROTECTIVE CASE ON AN ELECTRONIC DEVICE

FIELD

Various embodiments are described herein that generally relate to protective casings for electronic devices, and in particular, to a method and system for detecting the presence or absence of a protective case on an electronic device.

INTRODUCTION

Portable electronic devices such as cellular phones, smart phones, a variety of portable personal computing devices (e.g., personal digital assistants (PDA), electronic book readers, video game consoles, and the like) have become ubiquitous globally. Due to their portability, apparatuses to provide them with protection against physical damage (e.g., hits, scratches, drops, etc.) have become prevalent as well. A widely available, yet inexpensive, solution to protect such portable electronic devices against damage is to use a protective cover, also commonly referred to as a protective case. A protective case may be manufactured in different sizes and with a variety of materials (e.g., silicone, leather, plastics, gels, etc.) which may be substantially rigid or at least partially deformable (flexible and/or stretchable). A prominent feature of protective cases is that they are not a permanent addition to the electronic device and can be detached.

SUMMARY OF THE VARIOUS EMBODIMENTS

In accordance with a broad aspect of the teachings herein, there is provided at least one embodiment of an electronic device for detecting the presence of a protective case on the electronic device, the electronic device comprising: one or more sensors; a device memory storing an application including programs instructions for performing a method for detecting the presence of the protective case; a device processor coupled to the device memory and the one or more sensors, the device processor, upon execution of the application, being configured to: monitor, via at least one first sensor of the one or more sensors, a trigger condition for detecting the presence of the protective case; detect the trigger condition; in response to detecting the trigger condition, cause the electronic device to vibrate for a pre-determined period of time; collect, via at least one second sensor of the one or more sensors, sensor data during the pre-determined time; extract at least one feature from the sensor data; based on the extracted at least one feature, determine whether the protective case is applied to the electronic device; and generate an output indicating whether the protective case is applied to the electronic device.

In some embodiments, the trigger condition comprises detecting a sensor value, generated by the at least one first sensor, that is greater than a pre-determined sensor value threshold.

In some embodiments, the electronic device further comprises a vibrating device, and causing the device to vibrate comprises activating the vibrating device.

In some embodiments, the electronic device further comprises an audio speaker, and when the electronic device is caused to vibrate the device processor further activates the audio speaker to emit an audio tone.

In some embodiments, the first and second sensors comprise each comprise at least one of an accelerometer or a gyroscope.

In some embodiments, the at least one second sensor comprises a microphone.

In some embodiments, the extracted feature comprises at least one of amplitude, frequency, energy and a Fast Fourier Transform (FFT) of the sensor data.

In some embodiments, the device processor is further configured to determine, for each extracted feature, one or more feature-specific values.

In some embodiments, the one or more feature-specific values comprise at least one of a minimum value, a maximum value, an average value, a standard deviation or a variation (x) value.

In some embodiments, determining whether the protective case is applied to the electronic device comprises comparing the one or more feature-specific values to at least one of baseline feature-specific values corresponding to a positive case indicating a presence of a protective case, and baseline feature-specific values corresponding to a negative case indicating an absence of a protective case.

In some embodiments, the comparing comprises determining a similarity measure between the one or more feature-specific values to at least one of the positive case and negative case baseline feature-specific values.

In some embodiments, determining whether the protective case is applied to the electronic device comprises inputting the one or more feature-specific values into a trained machine learning model.

In accordance with another broad aspect of the teachings herein, there is provided a method for detecting the presence of a protective case on an electronic device, the method comprising: monitor, via at least one first sensor of the one or more sensors of the electronic device, a trigger condition for detecting the presence of the protective case; detect, via a device processor of the electronic device, the trigger condition; in response to detecting the trigger condition, cause the electronic device to vibrate for a pre-determined period of time; collect, via at least one second sensor of the one or more sensors of the electronic device, sensor data during the pre-determined time; extract, using the device processor, at least one feature from the sensor data; based on the extracted at least one feature, determine, using the device processor, whether the protective case is applied to the electronic device; and generate, using the device processor, an output indicating whether the protective case is applied to the electronic device.

In some embodiments, the trigger condition comprises detecting a sensor value, generated by the at least one first sensor, that is greater than a pre-determined sensor value threshold.

In some embodiments, causing the electronic device to vibrate for a pre-determined period of time comprises activating a vibration device of the electronic device.

In some embodiments, causing the electronic device to vibrate for a pre-determined period of time comprises activating an audio speaker of the electronic device to emit an audio tone.

In some embodiments, the first and second sensors comprise each comprise at least one of an accelerometer or a gyroscope.

In some embodiments, the at least one second sensor comprises a microphone.

In some embodiments, the extracted feature comprises at least one of amplitude, frequency, energy and a Fast Fourier Transform (FFT) of the sensor data.

In some embodiments, the method further comprises determining, using the device processor, for each extracted feature, one or more feature-specific values.

In some embodiments, the one or more feature-specific values comprise at least one of a minimum value, a maximum value, an average value, a standard deviation or a variation(x) value.

In some embodiments, determining whether the protective case is applied to the electronic device comprises comparing, using the device processor, the one or more feature-specific values to at least one of baseline feature-specific values corresponding to a positive case indicating a presence of a protective case, and baseline feature-specific values corresponding to a negative case indicating an absence of a protective case.

In some embodiments, the comparing comprises determining, using the device processor, a similarity measure between the one or more feature-specific values to at least one of the positive case and negative case baseline feature-specific values.

In some embodiments, determining whether the protective case is applied to the electronic device comprises inputting the one or more feature-specific values into a trained machine learning model stored on a device memory of the electronic device.

BRIEF DESCRIPTION OF THE DRAWINGS

For a better understanding of the various embodiments described herein, reference will be made, to the accompanying drawings. The drawings are not intended to limit the scope of the teachings described herein.

FIG. 4A is a front view of an example embodiment of an electronic device with a built-in three-axis accelerometer.

FIG. 4B is a side view of the example electronic device of FIG. 4A.

FIG. 5A is a front view of an example electronic device with a built-in three-axis rotation sensor.

FIG. 5B is a side view of the example electronic device of FIG. 5A.

Figure 1:
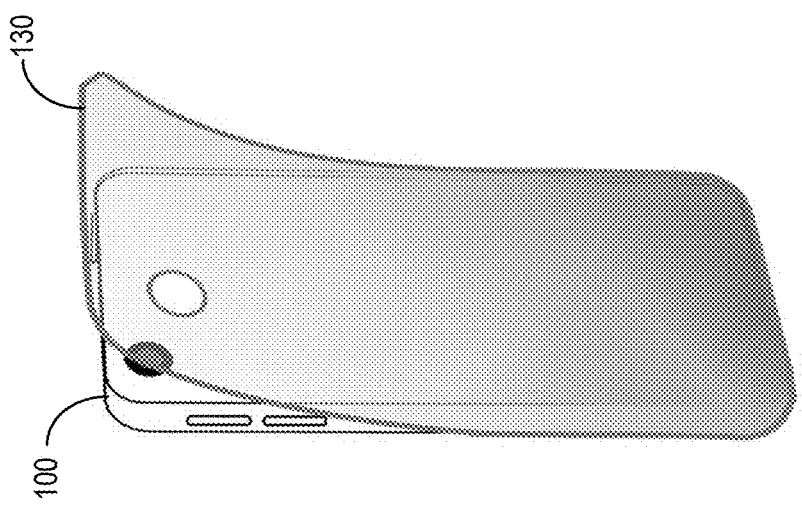
FIG. 1 is a schematic illustration of an example electronic device with a removable protective case.

Further aspects and features of the example embodiments described herein will appear from the following description taken together with the accompanying drawings.

DETAILED DESCRIPTION OF THE EMBODIMENTS

Various embodiments in accordance with the teachings herein will be described below to provide an example of at least one embodiment of the claimed subject matter. No embodiment described herein limits any claimed subject matter. The claimed subject matter is not limited to devices, systems or methods having all of the features of any one of the devices, systems or methods described below or to features common to multiple or all of the devices, systems or methods described herein. It is possible that there may be a device, system or method described herein that is not an embodiment of any claimed subject matter. Any subject matter that is described herein that is not claimed in this document may be the subject matter of another protective instrument, for example, a continuing patent application, and the applicants, inventors or owners do not intend to abandon, disclaim or dedicate to the public any such subject matter by its disclosure in this document.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the example embodiments described herein.

Referencing the figures is meant only to provide an example of how the embodiments described herein are structured and intended to function, and in no way limits the scope of the embodiments of the claimed subject matter. For instance, although the figures show a particular electronic device, a smartphone, the scope of the claimed subject matter includes many other electronic devices.

It should also be noted that the terms "coupled" or "coupling" as used herein can have several different meanings depending in the context in which these terms are used. For example, the terms coupled or coupling can have a mechanical, fluidic or electrical connotation. For example, as used herein, the terms coupled or coupling can indicate that two elements or devices can be directly connected to one another or connected to one another through one or more intermediate elements or devices via an electrical or magnetic signal, electrical connection, an electrical element or a mechanical element depending on the particular context. Furthermore coupled electrical elements may send and/or receive data.

Unless the context requires otherwise, throughout the specification and claims which follow, the word "comprise" and variations thereof, such as, "comprises" and "comprising" are to be construed in an open, inclusive sense, that is, as "including, but not limited to".

It should also be noted that, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that terms of degree such as "substantially", "about" and "approximately" as used herein mean a reasonable amount of deviation of the modified term such that the end result is not significantly changed. These terms of degree may also be construed as including a deviation of the modified term, such as by 1%, 2%, 5% or 10%, for example, if this deviation does not negate the meaning of the term it modifies.

Furthermore, the recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed, such as 1%, 2%, 5%, or 10%, for example.

Reference throughout this specification to "one embodiment", "an embodiment", "at least one embodiment" or "some embodiments" means that one or more particular features, structures, or characteristics may be combined in any suitable manner in one or more embodiments, unless otherwise specified to be not combinable or to be alternative options.

As used in this specification and the appended claims, the singular forms "a," "an," and "the" include plural referents unless the content clearly dictates otherwise. It should also be noted that the term "or" is generally employed in its broadest sense, that is, as meaning "and/or" unless the content clearly dictates otherwise.

The headings and Abstract of the Disclosure provided herein are for convenience only and do not interpret the scope or meaning of the embodiments.

Similarly, throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), optical pathways (e.g., optical fiber), electromagnetically radiative pathways (e.g., radio waves), or any combination thereof. Exemplary communicative couplings include, but are not limited to, electrical couplings, magnetic couplings, optical couplings, radio couplings, or any combination thereof.

Throughout this specification and the appended claims, infinitive verb forms are often used. Examples include, without limitation: "to detect," "to provide", "to transmit", "to communicate", "to process", "to route", and the like. Unless the specific context requires otherwise, such infinitive verb forms are used in an open, inclusive sense, that is as "to, at least, detect, to, at least, provide", "to, at least, transmit" and so on.

The example embodiments of the systems and methods described herein may be implemented as a combination of hardware or software. For example, a portion of the example embodiments described herein may be implemented, at least in part, by using one or more computer programs, executing on one or more programmable devices comprising at least one processing element, and a data storage element (including volatile memory, non-volatile memory, storage elements, or any combination thereof). These devices may also have at least one input device (e.g. a keyboard, mouse, touchscreen, or the like), and at least one output device (e.g. a display screen, a printer, or the like) and a communication interface including one or more ports and/or radios depending on the nature of the device.

It should also be noted that there may be some elements that are used to implement at least part of the embodiments described herein that may be implemented via software that is written in a combination of high-level procedural language such as object-oriented programming as well as assembly language, machine language, or firmware as needed. For example, the program code may be written in C, C++ or any other suitable programming language and may comprise modules or classes, as is known to those skilled in object-oriented programming.

At least some of the software programs used to implement at least one of the embodiments described herein may be stored on a storage media (e.g., a computer readable medium such as, but not limited to, ROM, magnetic disk, optical disc) or a device that is readable by a programmable device. The software program code, when read by the programmable device, configures the programmable device to operate in a new, specific and predefined manner in order to perform at least one of the methods described herein.

Furthermore, at least some of the programs associated with the devices, systems and methods of the embodiments described herein may be capable of being distributed in a computer program product comprising a computer readable medium that bears computer usable instructions, such as program code, for one or more processors. The program code may be preinstalled and embedded during manufacture and/or may be later installed as an update for an already deployed computing system. The medium may be provided in various forms, including non-transitory forms such as, but not limited to, one or more diskettes, compact disks, tapes, chips, and magnetic and electronic storage. In alternative embodiments, the medium may be transitory in nature such as, but not limited to, wire-line transmissions, satellite transmissions, internet transmissions (e.g. downloads), media, digital and analog signals, and the like. The computer useable instructions may also be in various formats, including compiled and non-compiled code.

The terms "cloud" is used to describe a network of computing equipment distributed over multiple physical locations and accessible over the Internet.

The term "AI-powered model" is a mathematical model of given sample data, known as training data, used to make predictions or decisions without being explicitly programmed to perform the task. The model is obtained from algorithms in Artificial Intelligence in Computer Science.

The terms "binary classifier" is an AI-powered model whose task is to classify the elements of a given set into two groups, namely positive and negative.

The terms "protective case" and "case" refer to an apparatus that covers an electronic device fully or partially in order to protect it from damage. It is manufactured with different sizes and variety of materials (e.g., silicone, leather, gels, etc.) and may be substantially rigid or at least partially deformable (flexible and/or stretchable). Protective cases are not a permanent addition to the device and can be detached.

As stated in the background, protective covers for electronic devices—also commonly referred to as protective cases—have become a widely available, yet inexpensive solutions to protect and minimize damage to electronic devices. FIG. 1, for example, illustrates an example protective case 130 that can be removably applied to an electronic device 100 (e.g., a mobile phone).

As used herein, electronic devices can refer to any computing device, including portable electronic devices such as smartphones, tablet computers, laptops, wearable computing devices (e.g., smartwatches), personal digital assistants (PDA), electronic book readers, video game consoles, and the like.

In particular, it has been appreciated that users of electronic devices may benefit from receiving alerts (or notifications) when protective cases are not applied to their devices. For example, in many cases, users may not be aware that a protective case has inadvertently de-detached from their device. Otherwise, the protective case may have been removed, but the user may have inadvertently omitted to re-apply the case after removal. In these cases, alerting the user to the absence of the protective case can provide the user an opportunity to re-apply the case, and thereby reduce the risk of unforeseen damage to the device.

Similarly, it has also been appreciated that monitoring the presence of protective cases on electronic devices can also provide benefits to manufacturers—who in collaboration with warrantors, or individually—provide warranty coverage to damaged electronic devices. For example, in various cases, before validating a claim of warranty over a damaged device, manufacturers and/or warrantors will often require assurances that a protective case was applied to the electronic device at the point of damage. Accordingly, it may be desirable to automatically monitor and detect the presence of protective cases on devices at the time of damage.

In view of the foregoing, embodiments herein provide for a method and system for automatic detection of the presence of a protective case on an electronic device.

In accordance with the teachings provided herein, in some embodiments, the presence of a protective case is determined by activating a vibrating device located inside the electronic device (e.g., a built-in vibrating device). As the device is made to vibrate, vibration-induced sound is recorded and analyzed to determine whether or not a protective case is applied to the device. Alternatively, or in addition, data from built-in sensors (i.e., motion and orientation sensors) is also recorded during device vibration, and analyzed to determine the presence or absence of a protective case. In particular, it has been appreciated herein that vibration-induced sound, as well as certain sensor data captured during device vibration, may vary as between devices with a protective case, or devices without a protective case.

In accordance with other teachings provided herein, in at least some other embodiments, the presence of a protective case is determined by activating an audio speaker located inside the electronic device. The audio speaker can generate an audio tone which causes the electronic device to vibrate. Sensor data (i.e., motion and/or orientation sensors) is recorded during device vibration, and analyzed to determine the presence or absence of a protective case on the electronic device.

In accordance with still further teachings provided herein, the presence of a protective case is determined by monitoring and analyzing sensor data (e.g., motion, orientation and other environmental sensor data (e.g., light, pressure, and temperature)), while the device is resting on a surface, to determine the presence or absence of a protective case on the electronic device.

Figure 2:
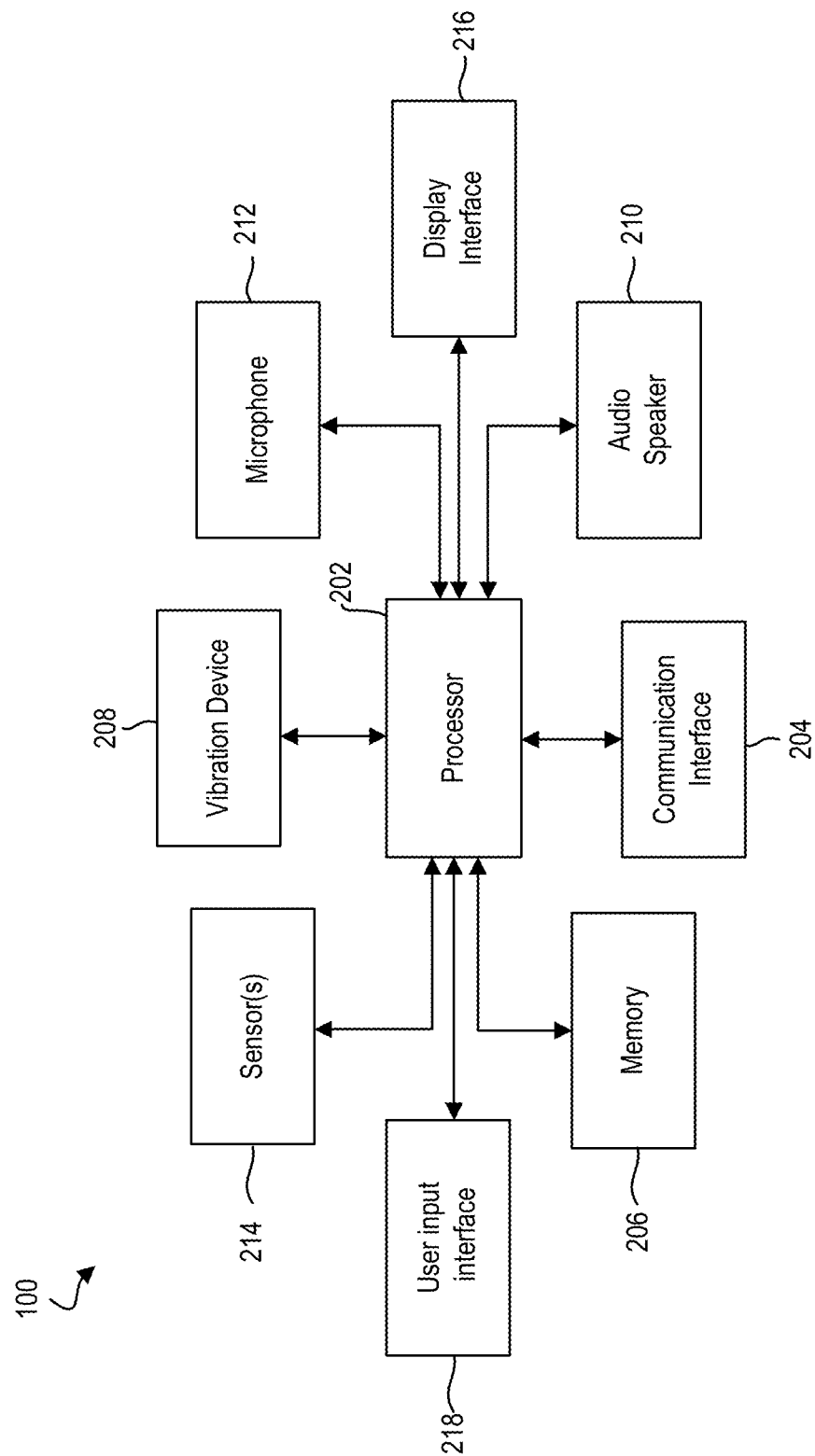
FIG. 2 is a simplified block diagram showing an example embodiment of electronic hardware located inside of an electronic device.

Referring now to FIG. 2, there is shown an example simplified hardware block diagram for an example embodiment of an electronic device 100.

As shown, the electronic device 100 generally includes a processor 202 coupled, via a data bus, to one or more of a communication interface 204, a memory 206, a vibration device 208, an audio speaker 210, a microphone 212 (or an audio recording unit), one or more sensors 214, a display interface 216 and an input/output (I/O) interface 218. In some embodiments, the electronic device 100 may not include all of components 204—218, and may only include a subset of the illustrated components. For example, in some cases, the electronic device 100 may not include one or more of the vibration device 208, audio speaker 210, microphone 212 or one or more sensors 214.

Processor 202 is a computer processor, such as a general purpose microprocessor. In some other cases, processor 202 may be a field programmable gate array (FPGA), application specific integrated circuit (ASIC), microcontroller, or other suitable computer processor.

Communication interface 204 is one or more data network interface, such as an IEEE 802.3 or IEEE 802.11 interface, for communication over a network.

Processor 202 is coupled, via a computer data bus, to memory 206. Memory 206 may include both volatile and non-volatile memory. Non-volatile memory stores computer programs consisting of computer-executable instructions, which may be loaded into volatile memory for execution by processor 202 as needed. It will be understood by those of skill in the art that references herein to the electronic device 100 as carrying out a function, or acting in a particular way, imply that processor 202 is executing instructions (e.g., a software program) stored in memory 206 and possibly transmitting or receiving inputs and outputs via one or more interfaces. Memory 206 may also store data input to, or output from, processor 202 in the course of executing the computer-executable instructions.

Figure 6:
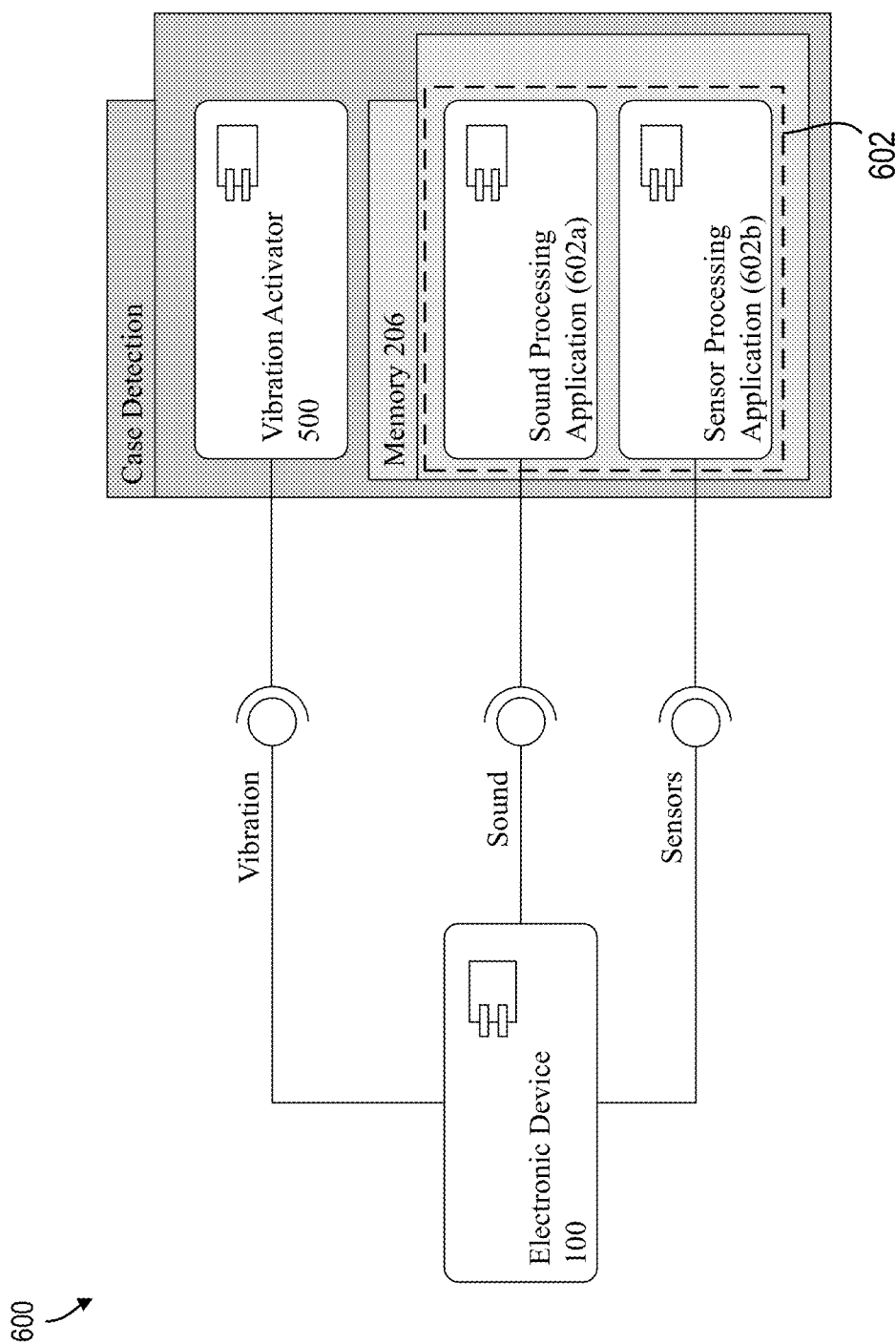
FIG. 6 is a simplified software/hardware block diagram for an example electronic device, in accordance with the teachings provided herein.

As provided herein, with reference to FIG. 6, the memory 206 may store one or more software programs which can be used for automatic detection of the presence or absence of a protective case 130 on an electronic device. In particular, the software programs may be configured—upon execution by the processor 202—to perform one or more of the methods which are described in further detail herein (i.e., FIGS. 7, 9, 12, 16, 17 and/or 18). In some cases, the software programs can be software applications deployed to and installed on the electronic device 100. Depending on the nature of the operating system and/or platform of the electronic device 100, the software applications may be deployed directly to the electronic device 100, and/or the applications may be downloaded from an application marketplace. For example, a user of the electronic device 100 may download the applications through an app store such as the Apple App Store™ or Google™ Play™.

Memory 206 can also store data generated by one or more of the components of electronic device 100. For example, as explained herein, memory 206 can store data captured by the microphone 212 and/or sensors 214. The data captured by these components can be analyzed by one or more software programs, stored on memory 206 and executing on processor 202, to determine the presence (or absence) of a protective case 130 on the electronic device 100. Vibration device 208 may be any device which, upon activation, causes mechanical vibration of the electronic device 100. In various cases, vibration device 208 is a mobile phone surface mount (SMD/SMT) vibration motor that comprises an eccentric rotating mass vibration motor (ERM) and/or a linear vibration motor. In many cases, electronic devices 100 (e.g., mobile phones) may already include built-in vibration devices to provide haptic effects for users of the electronic device 100. For example, as shown in FIG. 3, a vibration motor 208 may be pre-built inside (or otherwise installed inside) of the electronic device 100. As provided herein, the vibration device 208 may be controlled to cause sufficient vibrational forces such that vibration-induced sound is generated and detected by the microphone 212. In other cases, the vibration device 208 can cause sufficient vibrational forces to be detectable by one or more motion and/or orientation sensors 214. In some embodiments, the vibration device 208 can effect vibration forces of up to 0.2 g to 0.8 g.

Figure 3A:
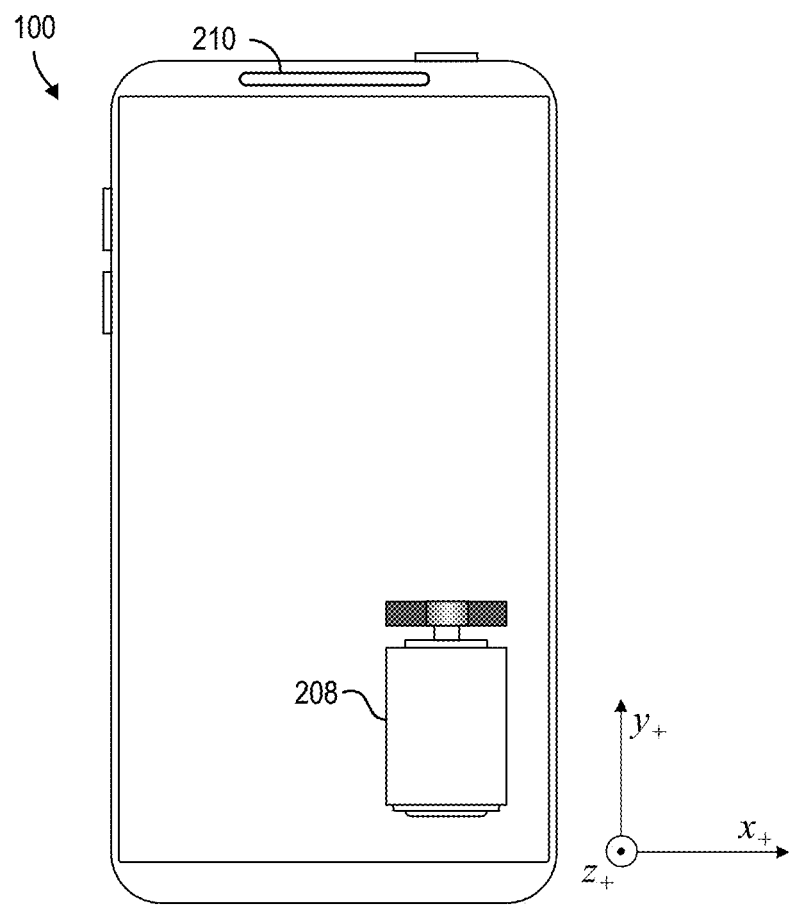
FIG. 3A is a front-side, partial-internal view of an example embodiment of an electronic device with a built-in vibration device.
Figure 3B:
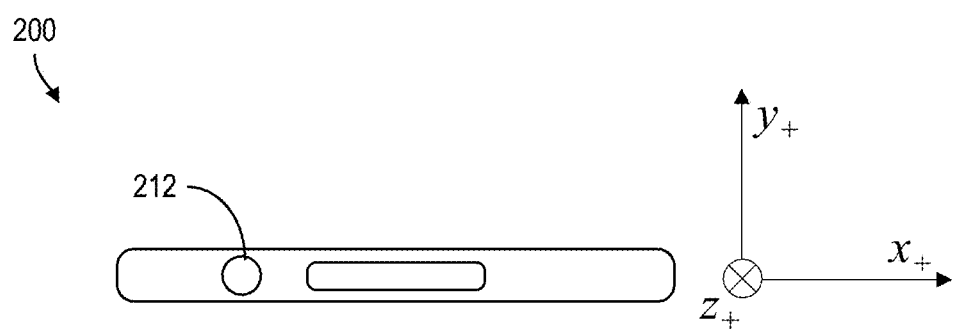
FIG. 3B is a bottom view of an example embodiment of an electronic device with a built-in audio recording device.

Audio speaker 210 is any device configurable to output an auditory signal. As shown in FIG. 3A, the audio speaker 210 can be—for example—a front-facing speaker of a mobile device.

Microphone 212 is any sensor that is used along with hardware (e.g. an amplifier, a filter and an analog to digital convertor) and software to provide a device used to detect, monitor and record surrounding auditory noise. For example, referring briefly to FIG. 3B, the microphone 212 may be an audio sensor that is located on a bottom edge of a mobile phone. While illustrated separately from sensors 214, it will be appreciated that the microphone 212 may itself be regarded as a sound detection sensor. In other embodiments, any other audio recording unit may be provided inside of the electronic device 100.

Sensors 214 can include various sensors for monitoring and measuring motion and rotation of the electronic device 100, as well as surrounding environmental parameters. For example, sensors 214 can include one or more of a three-axis accelerometer, a three-axis gyroscope, an inertial measurement unit (IMU), as well as pressure sensors, optical (e.g. light) sensors, temperature sensors and/or humidity sensors.

Referring briefly to FIGS. 4A and 4B, there is shown an example electronic device 100 (e.g., a mobile phone), and illustrating accelerometer parameters measurable by a built-in three-axis accelerometer. As shown, the three-axis accelerometer can measure linear acceleration along the X-axis direction—i.e., extending between the lateral sides 100c, 100d of the device (e.g., positive X-axis direction 402a, and negative X-axis direction 402b), the Y-axis direction—extending between the top 100a and bottom 100b of the device (e.g., positive Y-axis direction 404a, and negative Y-axis direction 404b), and the Z-axis direction—i.e., extending between the front 100e and the rear 100f of the device. (e.g., positive Z-axis direction 406a, and negative Z-axis direction 406b).

Referring briefly to FIGS. 5A and 5B, there is shown an example electronic device 100 (e.g., a mobile phone), and illustrating gyroscope parameters measurable by a built-in three-axis gyroscope. As shown, the three-axis gyroscope can measure rotational acceleration along the X-axis (e.g., positive direction pitch 504a, and negative direction pitch 502b), Y-axis (e.g., positive direction roll 504a, and negative direction roll 502b), and the Z-axis (e.g., positive direction yaw 506a, and negative direction yaw 506b).

Referring back to FIG. 2, display interface 216 is any suitable display (e.g., a screen) for outputting information and data as needed by various computer programs. In some cases, display 216 may display a graphical user interface (GUI) associated with one or more software programs stored on memory 206.

User input interface 218 is any interface used for receiving user inputs (e.g., buttons). In some cases the display interface 216 can be a touch screen display, and accordingly may function as a user input interface 218.

Referring now briefly to FIG. 6, there is shown a simplified hardware/software block diagram 600 for the electronic device 100, in accordance with some embodiments.

As stated previously, memory 206—of electronic device 100—can store one or more software programs 602 for use in automatic detection of the presence of a protective case 130. For example, as shown, the memory 206 can store one or more of a sound processing application 602a and/or a sensor processing application 602b. As provided herein, the sound processing application 602a can receive sound data (e.g., captured by microphone 212), and analyze the sound data to determine the presence of a protective case 130 on the device. Similarly, the sensor processing application 602b can receive sensor data (e.g., generated by sensors 214), and analyze the sensor data to determine the presence of a protective case 130 on the device. While illustrated as separate applications, each of the sound and sensor processing applications 602a, 602b may comprise a single protective case detection application 602.

Figure 7:
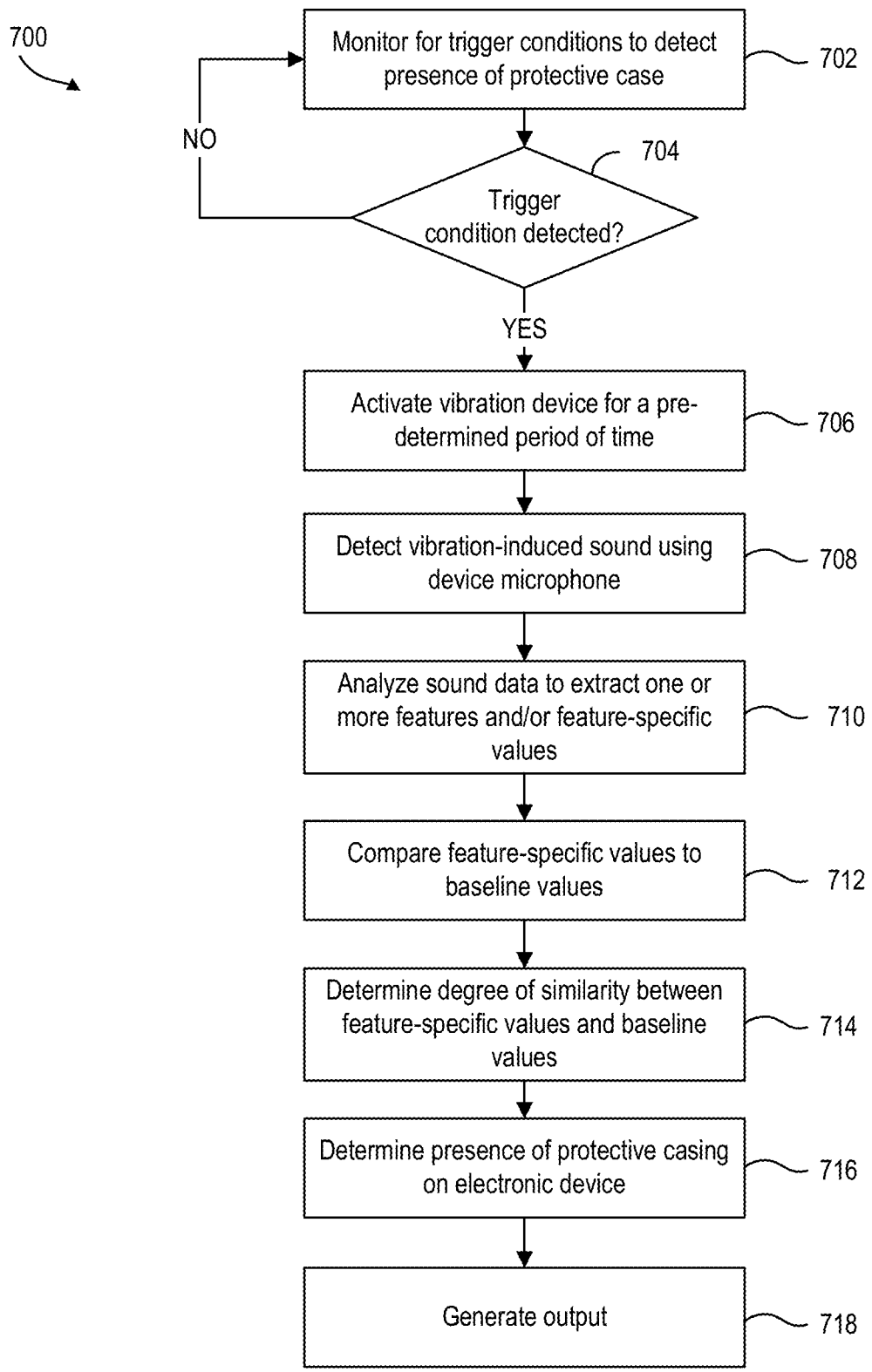
FIG. 7 is an example embodiment of a process flow for a method for automatic detection of the presence of a protective case on an electronic device based on vibration-induced sound.
Figure 9:
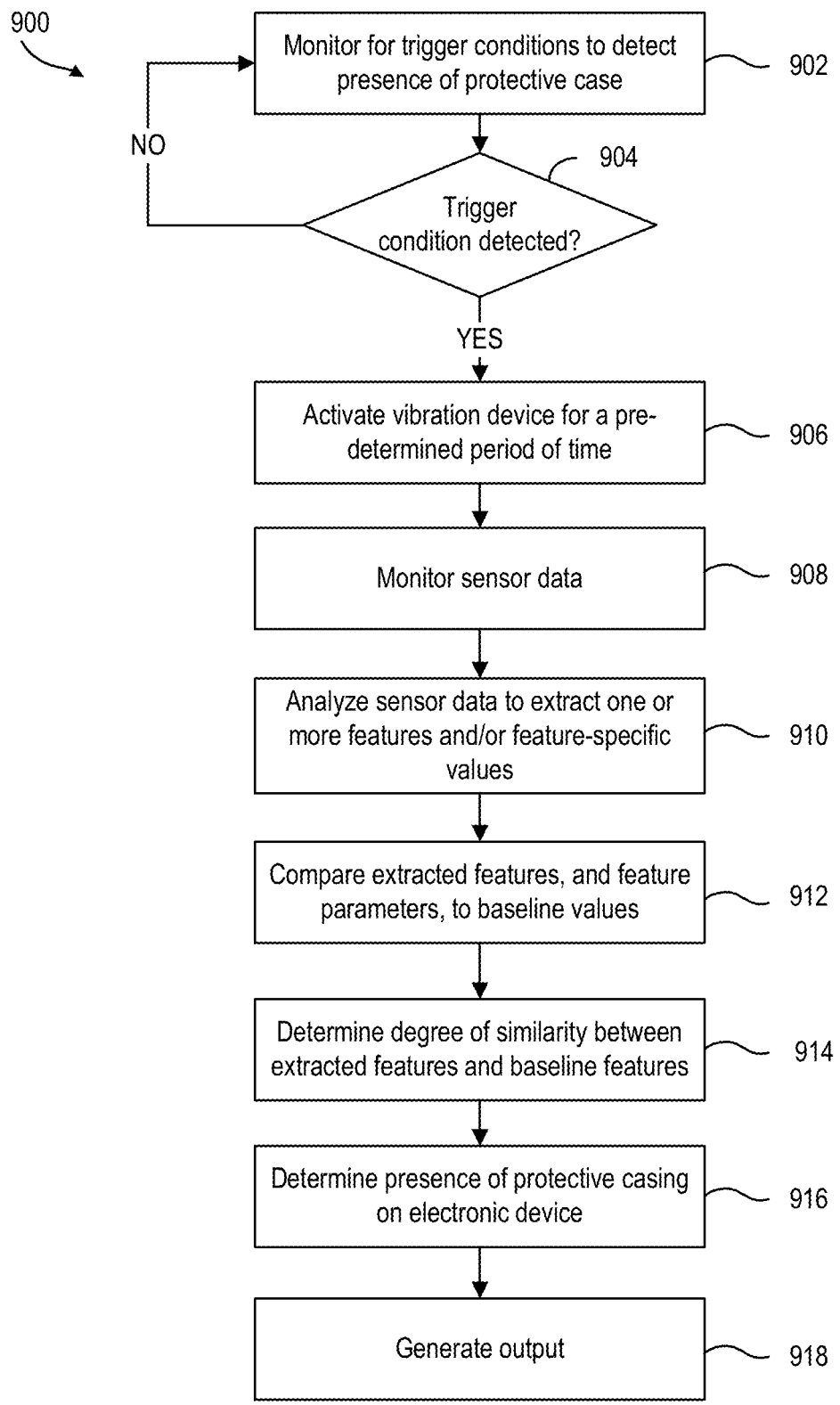
FIG. 9 is an example embodiment of a process flow for a method for automatically detecting the presence a protective case on an electronic device using sensor data generated during vibration of the electronic device.

Referring now to FIGS. 7 and 9, which illustrate example embodiments of process flows of methods for automatically detecting the presence of a protective case 130, on the electronic device 100, by vibrating the electronic device 100 using the vibration device 208.

Referring first to FIG. 7, there is shown an example embodiment of a process flow for a method 700 for automatically detecting the presence of a protective case 130 on an electronic device 100. In particular, the method 700 is based on detecting vibration-induced sound resulting from activating vibration device 208 inside the electronic device 100. To this end, it has been appreciated that the presence or absence of a protective case 130 on the electronic device 100 can impact vibration-induced sound data generated by vibrating the electronic device 100. The method 700 can be implemented, for example, using protection case detection application 602 (e.g., sound processing application 602a), executing on device processor 202.

As shown, at act 702, case detection application 602 can monitor for one or more trigger conditions indicating that the case detection application 602 should commence determining whether or not a protective case 130 is applied to the electronic device 100.

In some embodiments, the trigger conditions monitored at act 702 can be user-induced. For example, a user—of electronic device 100—may request case detection application 602 to execute the test for detecting the presence of a protective case 130 on the device. For instance, a graphical user interface (GUI)—associated with case detection application 602—can display an option for the user (e.g., via display interface 612) to execute the test to determine the presence of a protective case 130. In various cases, this may be required as part of a warranty condition on the device, which requires the device user to run intermittent detection tests to confirm a protective case 130 is applied. At a subsequent time, if the electronic device 100 is damaged, the warranty provider may validate the warranty claim by accessing test results to ensure a protective case 130 has been generally applied to the electronic device 100. For example, the warranty provider may access test results stored on the device memory 206, or otherwise transmitted to a third-party computing device (e.g., associated with the warranty provider).

The trigger condition, at act 702, may also be an automated trigger. More specifically—rather than being user-induced—case detection application 602 can automatically trigger the protective case detection test. For example, case detection application 602 can trigger the test at pre-determined time or frequency intervals.

In addition to validating warranty claims, automated triggers can also act as a safety feature for device users. For example, automated triggers—i.e., to detect the presence of a protective case 130 on an electronic device 100—can be used to alert users when a protective case 130 is not detected. For example, a user may not be aware that the protective case 130 is detached from the electronic device 100, or otherwise, that the case was not re-applied after being removed from the electronic device 100. In this manner, automated monitoring for the presence of the protective case 130 can assist a user to take proactive measures to apply the case to a device when no case is detected, and in turn, minimize potential damage to the electronic device 100.

In various cases, the periodicity (or frequency) of the automated test can be adjusted by the user (e.g., via the user input interface 218). In other cases, the case detection application 602 may be pre-configured (e.g., by an application developer) to run the automated test at specific time or frequency intervals.

The trigger condition, at act 702, may also correspond to a trigger event. The trigger event can include, for example, detecting that the device has been dropped, incidentally hit or otherwise damaged. The detected event can, in turn, prompt case detection application 602 to run the protective case detection test. In particular, warranty conditions can require a protective case 130 to be applied at the point of damage. Accordingly, in various cases, the results of the detection test—resulting from the trigger event—can be accessed by a warranty provider to confirm that a protective case 130 was applied to the device at the time of damage.

In some embodiments, trigger events can be detected by monitoring outputs from one or more sensors 214. For example, a sudden increase in linear acceleration recorded by an accelerometer, or a sudden increase in rotational acceleration recorded by a gyroscope, can indicate a drop event. For instance, a drop event can correspond to recording linear acceleration above a pre-determined linear acceleration threshold (e.g., greater than 7.0-11.0 m/s$^2$) or rotational acceleration above a pre-determined rotational acceleration threshold (e.g., greater 0.5-10 rad/s$^2$). In other cases, a sudden increase in pressure values, recorded by a pressure sensor (e.g., a pressure value between 0.5-3.0 PSI]), can indicate an impact event (e.g., an incidental hit). In various cases, the case detection application 602 may monitor for detected trigger events over pre-defined time or frequency intervals (e.g., every 1-5 seconds).

At act 704, the case detection application 602 can determine whether a trigger condition has been detected, i.e., based on monitoring sensor output values. In cases where the trigger condition is not detected, the method 700 can return to act 702 and iterate until the trigger condition is detected. Otherwise, if a trigger condition is detected, at act 706, the case detection application 602 can activate the vibration device 208. For example, an API or system call by the case detection application 602 to the device operating system can be used to activate the vibration device 208.

In some embodiments—upon detecting the trigger condition—the application 602 may not immediately activate the vibration device 208. For example, in some cases, where the trigger condition corresponds to a dropped device, the application 602 may wait a pre-determined period of time (e.g. 2—5 seconds) before activating the vibration device 208. The pre-determined time can ensure that the electronic device 100 has landed on the ground before activating the vibration device 208. In other cases, the method can involve monitoring, by application 602, and detecting a second trigger condition. For example, in a drop event, the second trigger condition can correspond to detecting that the electronic device 100 has landed on a surface. For example, the second trigger condition can involve detecting the linear acceleration measured by an accelerometer is within a pre-determined linear acceleration range (e.g., 0.003 to 0.004 m/s$^2$), or rotational acceleration measured by a gyroscope is within a pre-determined rotational acceleration range (e.g., 0.1 and 0.001 m/s$^2$). Once the second trigger condition is detected, the application 602 can activate the vibration device 208.

In some cases, application 602 may automatically begin monitoring for the second trigger condition from the start of the method 700. In other cases, the second trigger condition is monitored only once the first trigger condition has been detected (e.g., act 704). In some cases, the application 602 may only monitor for the second trigger condition in respect of specific detected first trigger conditions. In other words, the second trigger condition is only monitored if the first trigger condition indicates a drop event (e.g., based on sensor values). That is, it may only be necessary to monitor for second trigger conditions when certain first trigger conditions are detected. In particular, it may not be necessary to monitor for a second trigger condition if the first trigger condition is in respect of an automated or user-induced device protection test, or otherwise an impact event. In these cases, the vibration device 208 may be automatically activated after detecting the first trigger condition, as no second event is necessary (e.g., a phone landing) before carrying out the device protection test.

At act 706, the case detection application 602 can control parameters of the vibration device 208. For example, the case detection application 602 can control the frequency and/or amplitude (e.g., strength) of the vibration device 208. Case detection application 602 can also control the pattern of vibration of the vibration device 208 (e.g., vibrate 100 milliseconds and then sleep 1000 milliseconds, then vibrate 200 milliseconds and sleep 2000 milliseconds). In some embodiments, more complex patterns can result in higher detection rates of applied protective cases on electronic devices.

In some embodiments, the API—used to activate the vibration device 208—may provide the case detection application 602 with limited, pre-defined activation parameters. Accordingly, in these cases, the activation parameters are limited to those supported by the specification of the corresponding system call.

In various cases, the case detection application 602 can activate the vibration device 208 for a pre-determined period of time (e.g., 1-5 seconds).

At act 708—as the vibration device 208 is being activated—case detection application 602 can detect, via microphone 212, vibration induced-sound generated by the vibrating device 208. In some cases, the case detection application 602 may automatically activate the microphone 212 to begin streaming (e.g., collecting) vibration sound immediately, or shortly after, the trigger condition is detected at act 704. The collected sound data may then be stored by case detection application 602 inside the memory 206. In some cases, as discussed previously, where a first and second trigger condition are necessary before activating the vibration device 206, the microphone 212 may be activated after the second trigger condition is detected.

At act 710, the case detection application 602 can determine that the pre-determined vibration period has lapsed. In turn, the case detection application 602 can de-activate the vibration device 208, and can retrieve the collected vibration-induced sound data from memory 206. The sound data is then analyzed to determine whether a protective case 130 is applied to the electronic device 100.

In particular, at act 710, the sound data can be analyzed to extract one or more sound data features. The extracted features can include, by way of non-limiting examples, the amplitude of the sound data over the vibration period, the frequency of the sound data, and the calculated energy of the data. The extracted features can also include determining the Fast Fourier Transform (FFT) of the recorded sound data.

For each extracted features, at act 710, one or more feature-specific values can also be determined. The feature-specific values can include—for each extracted feature—determining a minimum, maximum, average, standard deviation and variation(x) values. In particular, variation (x) values can correspond to the percentage of the values, in the sound signal, where a value increases or decreases by a pre-determined percent (i.e., x %), relative to its previous value over the duration of the sound signal. For example, determining the variation(x), may include determining a variation (50), or otherwise, determining when the signal values increase/decrease by at-least 50%, compared to their previous value. In other cases, the variation (x) may be determined for values of "x" equal to one or more of 25, 50, 75, 100, etc. The variation (x) can be computed over all signal values, or otherwise, over specific signal values. In the latter case, for example, variation (x) can be determined over the first or last twenty-five percent of the signal. In some cases, a variation (x,y) is determined, wherein the "y" variable represents the percentage of the signal analyzed.

At act 712, the feature-specific values—extracted at act 710—are compared to baseline values.

More specifically, memory 206 may store pre-determined sound "baselines". A sound baseline is sound data corresponding to the "true" vibration-induced sound with and/or without a protective case 130.

In some cases, the sound baseline is pre-recorded in an experimental, clean environment wherein the electronic device is vibrated, and vibration-induced sound is recorded in two experimental scenarios: (a) a scenario where no protective case applied to the device (e.g., a negative test case), and (b) a scenario where a protective case is applied to the device (e.g., a positive case). In various cases, multiple experimental tests can be executed—for each of the two scenarios—under various testing conditions. For example, the various test conditions can include: (i) vibrating the electronic device on different surface types (e.g., varying levels of hardness (i.e., rugs, softwood, hard wood, asphalt, glass, etc)); (ii) vibrating electronic devices using different makes and models of protective cases (i.e., cases having varying levels of hardness and thickness); (iii) conducting the tests using different makes and models of electronic devices; and (iv) conducting tests with the varying levels of background noise.

In some cases, the experimental tests can be conducted, for example, by the application developer. Features, and feature-specific values, may then be extracted from the baseline sound data to form the baseline dataset.

In some cases, the sound "baseline" may not be pre-determined, but may be user-generated. For example, upon installing case detection application 602 on an electronic device 100 (or anytime thereafter), case detection application 602 may prompt the user (e.g., via the display interface 216) to conduct an initialization baseline test. During the baseline test, the user may be requested to apply or remove the device protective case 130. In each scenario, the case detection application 602 may conduct a vibration test to generate baseline sound data in a controlled manner. For example, case detection application 602 may include a GUI that prompts the user—e.g., via the user input interface 218—to initiate one or more vibration tests with and/or without a protective case 130, while the device is resting on a surface. Once initiated, the case detection application 602 activates the vibration device 208 for a pre-determined time period, and records the vibration-induced sound. The vibration induced-sound is then analyzed to extract features, and feature-specific values, which are recorded in memory 206 as "baseline" values for a positive test case (e.g., a protective case 130 is present), and a negative test case (e.g., no protective case 130 is present). In this manner, the case detection application 602 can guide the user to generate the baseline values that are unique to the user's device.

Figures 8A, 8B:
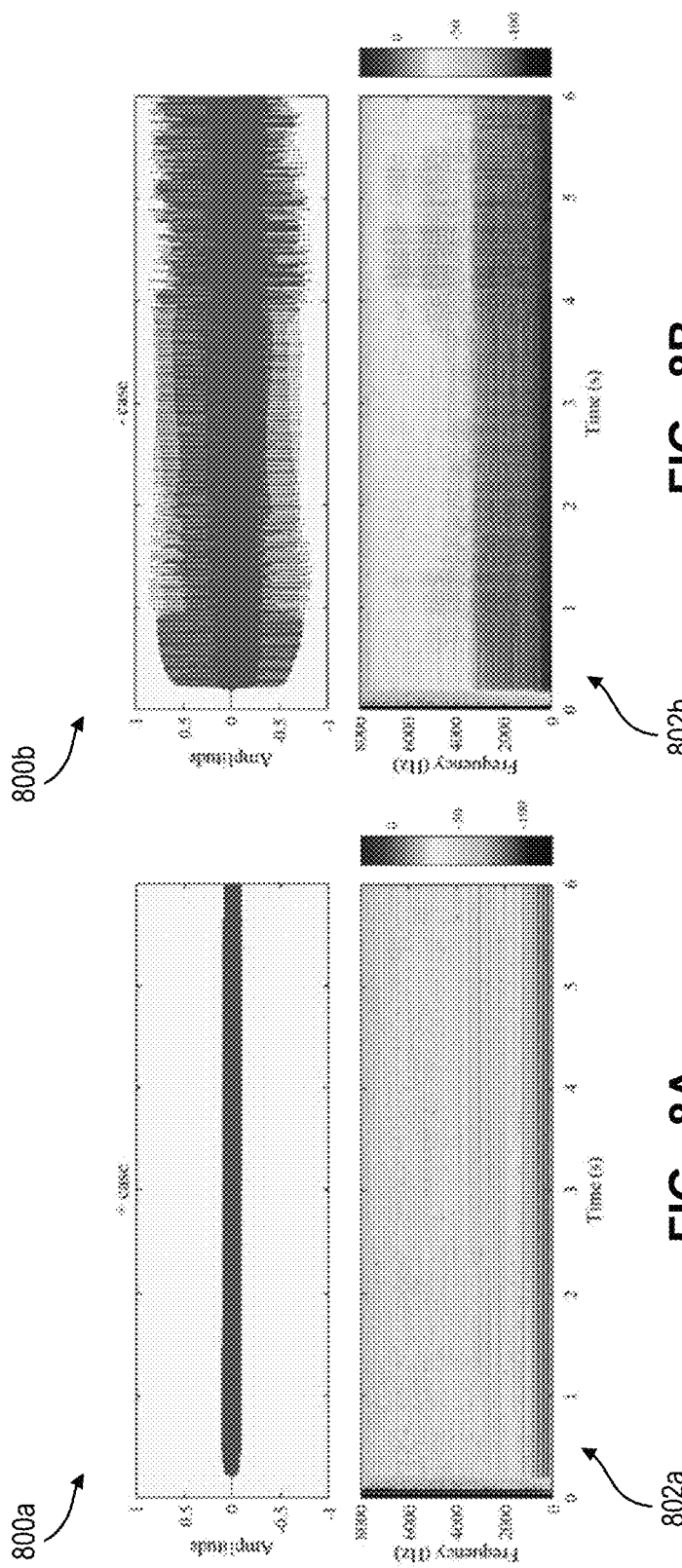
FIG. 8A shows plots for amplitude over time, and frequency over time, for vibration-induced sound generated by an example vibrating electronic device with a protective case applied.
FIG. 8B shows plots for amplitude over time, and frequency over time, for vibration-induced sound generated by an example vibrating electronic device with no protective case applied.

Referring now briefly concurrently to FIGS. 8A and 8B. FIG. 8A shows example plots 800a, 802a corresponding to example baseline amplitude and frequency values, respectively, for recorded vibration-induced sound when a protective case 130 is applied (e.g., a positive test case). FIG. 8B shows example plots 800b, 802b for example baseline amplitude and frequency values, respectively, for recorded vibration-induced sound when a protective case 130 is not applied (e.g., a negative test case).

As shown in FIGS. 8A and 8B, the presence of the protective case 130 (FIG. 8A) generates a different frequency and amplitude sound response (e.g., lower amplitude and frequency) as compared to where no protective case 130 is applied (FIG. 8B). In particular, this is owing to the fact that the protective case 130 dampens the effect of the vibration, and in turn, reduces the effect of the resulting vibration-induced sound.

Referring back to FIG. 7, at act 714, the degree of similarity between baseline feature-specific values (act 712) and recorded feature-specific values (act 710) are compared to determine whether the recorded vibration-induced sound is more similar to the negative baseline dataset (e.g., no protective case 130 applied), or the positive baseline dataset (a protective case 130 is applied). Based on this determination, at act 716, the recorded sound data is classified as either corresponding to a positive case scenario (e.g., a protective case 130 is present), or a negative case scenario (e.g., no protective case 130 is present).

In some cases, the similarity measure at act 714 is determined by comparing each extracted feature-specific value (act 710) to a corresponding base-line feature-specific value (act 712). For example, the comparison is performed using any suitable similarity measure, including determining a cosine distance, a Manhattan distance, a Euclidean distance, a Minkowski distance, or a Jaccard similarity. Based on the similarity value, it is then determined whether the similarity measure is smaller between the extracted feature-specific value and the negative baseline dataset (e.g., corresponding baseline feature-specific values for the negative dataset), or the positive baseline dataset (e.g., corresponding baseline feature-specific values for the negative dataset). In cases, where a plurality of extracted feature-specific values are compared to a plurality of baseline feature-specific values (e.g., positive and negative baselined datasets), a plurality of similarity values may be generated. In these cases, an averaging or combination (e.g., weighted or unweighted) of each of the similarity values can be used to determine whether the extracted feature-specific values more closely correspond to the positive or negative baseline dataset.

In some embodiments, only a single baseline dataset may be available for acts 712-714. For example, in some cases, only a positive case baseline data set is available, and the similarity to this dataset can indicate a protective case 130 was applied, and a dissimilarity may imply that no protective case 130 was applied.

In various embodiments, the sound "baseline" datasets are generated using the same vibration parameters (e.g., frequency, amplitude, pattern and activation time) as used at act 706. This, in turn, allows for a direct comparison between the recorded sound, and the baseline sound.

At act 718, an output is generated based on the determination at act 716. In particular, the output indicates whether or not a protective case 130 was applied at the instance the trigger condition was detected at act 704.

In some cases, the output can be stored in memory 206. For example, the output can be stored in memory 206 in association with a timestamp. Accordingly, when the user attempts to subsequently validate a warranty claim after damaging the device, the warranty provider may access the device memory 206 to retrieve a log of time-stamped test results. This, in turn, can be used to verify whether a protective case 130 was applied during a damage event (e.g., during a drop event). In some cases, in addition or in the alternative to a time-stamp, the output can be stored with an indication of the detected trigger (e.g., a drop or impact event, or specific sensor values instigated the protection case detection test) to provide more information to a warranty provider in regards to the context of the stored output. In other embodiments as provided herein, the output determination at act 718—as well as any associated data (e.g., timestamps, etc.)—can also be transmitted to a third party computing device or server (e.g., a $3^{rd}$ party computer or server associated with a warranty provider). In some cases, as explained herein, the output can be transmitted in real-time, or near real-time.

In still other cases, a notification may be transmitted to the user (e.g., via display interface 216, or audio speaker 210). For example, if the trigger condition—at act 704—corresponds to a routine test to check for the presence of a protective case 130 (e.g., automated or user-induced), the user may be immediately notified, or alerted, where no protective case 130 is detected. Accordingly, this can allow the user to take pre-emptive action to apply a protective case 130 before the device is damaged.

In various cases, the output may vary based on the trigger condition at act 704. For example, where the trigger condition is a trigger event (e.g., a drop, or impact event), case detection application 602 may be configured to automatically transmit the output to a third-party computing device associated with a warranty provider, or otherwise, store the output (and associated data) in a portion of memory 206 that is inaccessible (or unalterable) by the device user. Otherwise, where the trigger condition is an automated trigger which is used to monitor for the presence of a protective case 130 for the benefit of the user, the output can be a visual or audio notification to the user where no protective case 130 is detected. In some cases, memory 206 can store a look-up table that includes trigger conditions, and corresponding forms of output at act 718.

Referring now to FIG. 9, there is shown an example process flow for a method 900 for detecting the presence a protective case 130 on the electronic device 100, according to some other embodiments. The method 900 can be implemented, for example, by the processor 202 executing case detection application 602 (e.g., sensor processing application 602b in FIG. 6)

In particular, the method 900 is generally analogues to the method 700, with the exception that the presence—or absence—of a protective case 130 is determined by analyzing sensor data generated during device vibration, rather than analyzing vibration-induced sound data. To this end, it has been appreciated that the presence of a protective case 130 on the electronic device 100 can impact sensor data generated during device vibration. For example, motion and orientation sensor data (e.g., generated by an accelerometer or gyroscope) may vary between devices which have, or do not have, an applied protective case 130.

As shown, acts 902—906 of method 900 are generally analogous to acts 702-706 of method 700. At act 908, however, rather than monitoring the microphone 212 for vibration-induced sound, case detection application 602 can monitor sensor data generated by one or more sensors 214. For example, in some embodiments, case detection application 602 can monitor linear acceleration data generated by a three-axis accelerometer, or rotational acceleration data generate by a three-axis gyroscope.

At act 910, the sensor data is analyzed to extract one or more features, and determine one or more feature-specific values. In particular, act 910 is analogous to act 710 of FIG. 7, but with respect to sensor data rather than audio data.

At act 912, the feature-specific values are compared to feature-specific values determined from baseline sensor datasets. In particular, the baseline sensor datasets can be generated in a similar manner as previously described in relation to act 712 of FIG. 7. For example, baseline accelerometer and/or gyroscope data can be generated for a positive test case (e.g., a protective case 130 is applied), a negative test case (e.g., no protective case 130 is applied).

At acts 912 and 914, based on the degree of similarity between the feature-specific values and the baseline datasets, the recorded sensor data is classified as corresponding to a device with, or without, a protective case 130.

Figure 10:
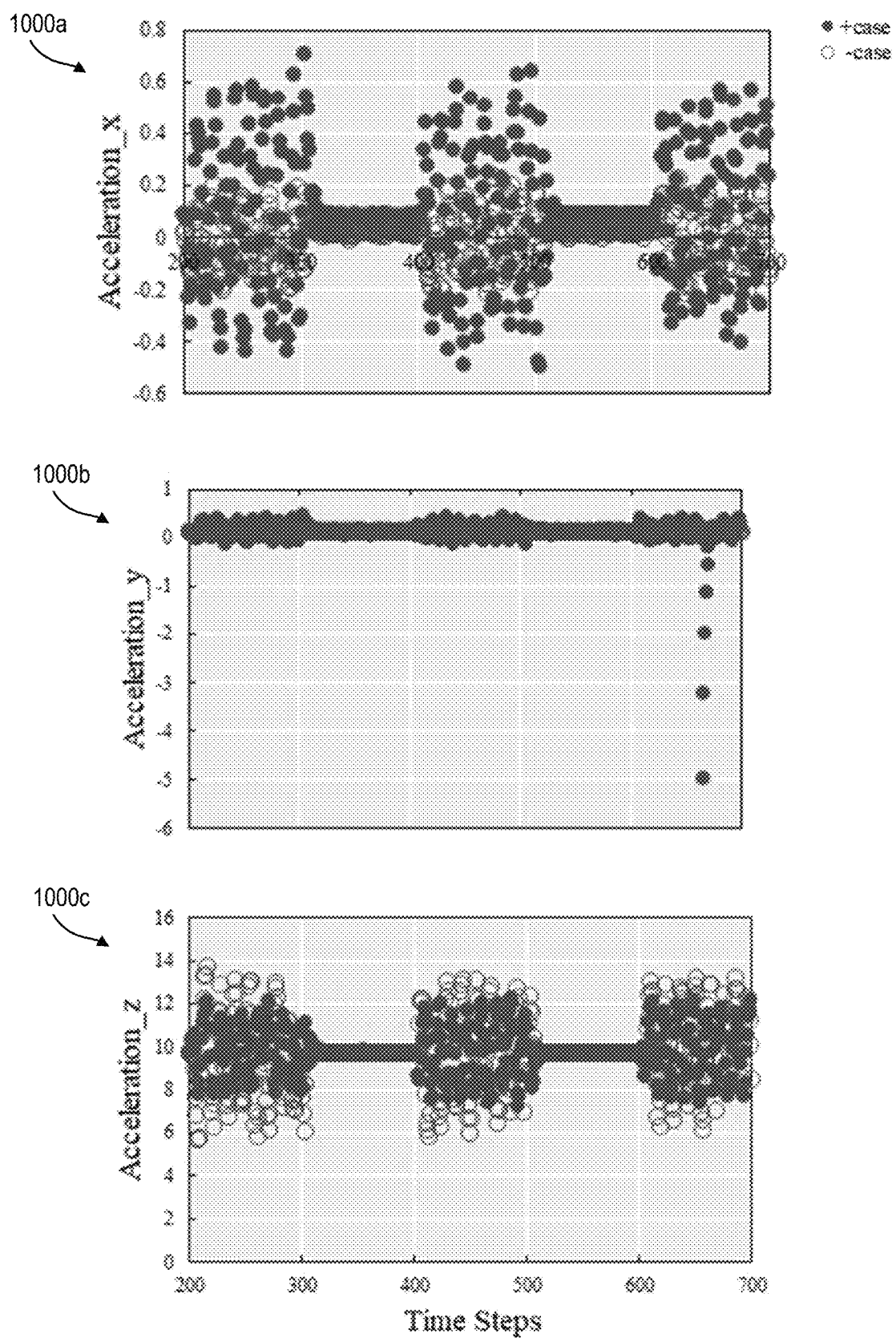
FIG. 10 shows plots for linear acceleration values—along the X, Y, and Z axes—obtained from a built-in accelerometer of a vibrating electronic device for both cases where a protective case is applied to the electronic device, and where no protective case is applied to the electronic device.
Figure 11:
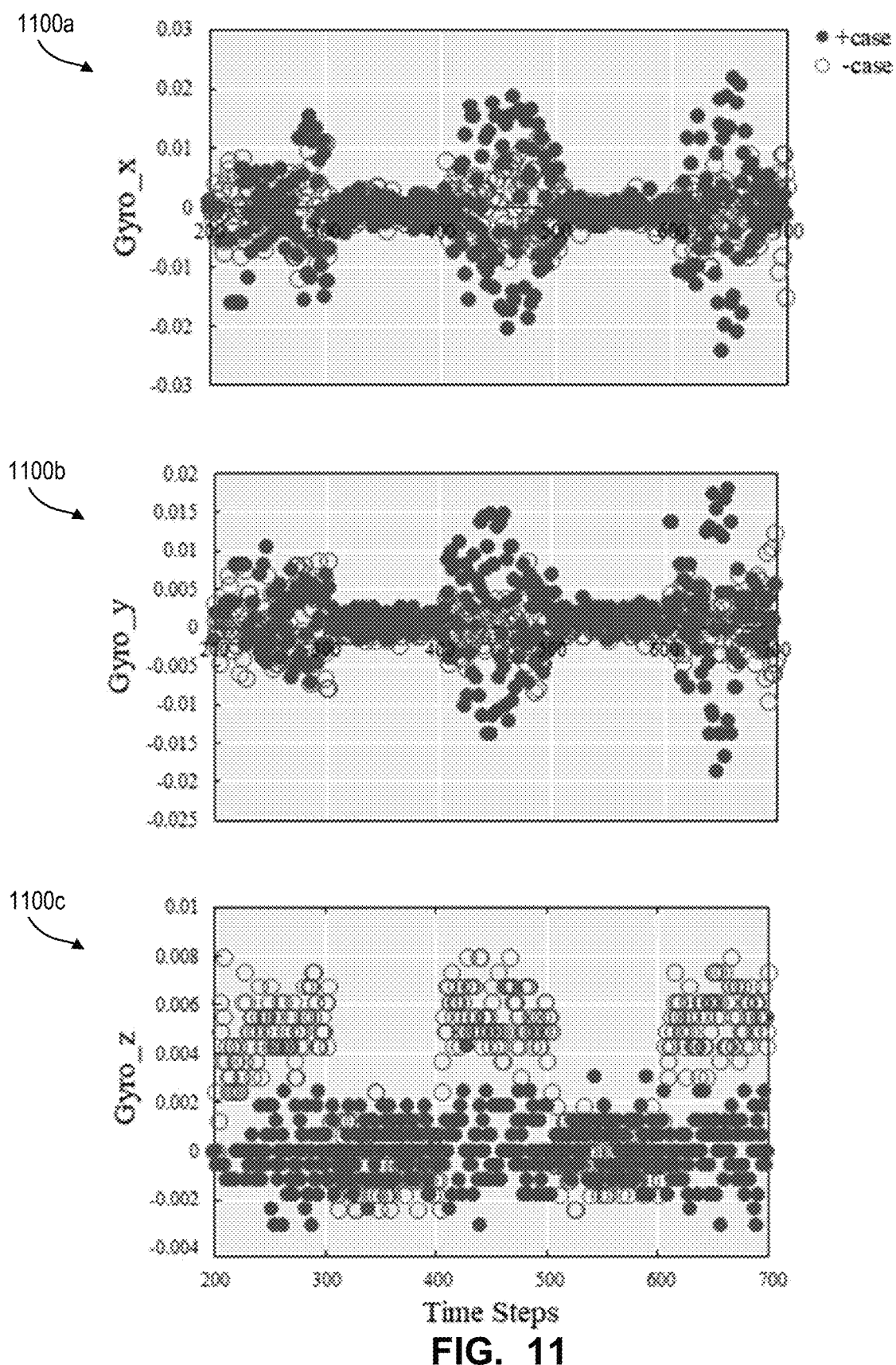
FIG. 11 shows plots for rotational acceleration values—along the X, Y, and Z axes—obtained from a built-in gyroscope of a vibrating electronic device for both cases where a protective case is applied to the electronic device, and where no protective case is applied to the electronic device.

Referring now briefly to FIGS. 10 and FIG. 11. FIG. 10 shows example plots for baseline amplitude values for linear acceleration data (e.g., accelerometer data) for example vibrating devices, with and without a protective case 130, along the X-axis (plot 1000a), Y-axis (plot 1000b), and Z-axis (plot 1000c). FIG. 11 shows example plots for baseline values for rotational acceleration data (e.g., gyroscope data) for example vibrating devices, with and without a protective case 130, in the X-axis (plot 1100a), Y-axis (plot 1100b), and Z-axis (plot 1100c). In particular, the axes in the plots shown in FIGS. 10 and 11 are defined as shown in FIGS. 4A and 4B.

As shown in each of the plots of FIGS. 10 and 11, the acceleration and gyroscope data generated for the positive case (e.g., with a protective case 130) is more pronounced in contrast to when a protective case 130 is not present (e.g., a negative case).

Figure 12:
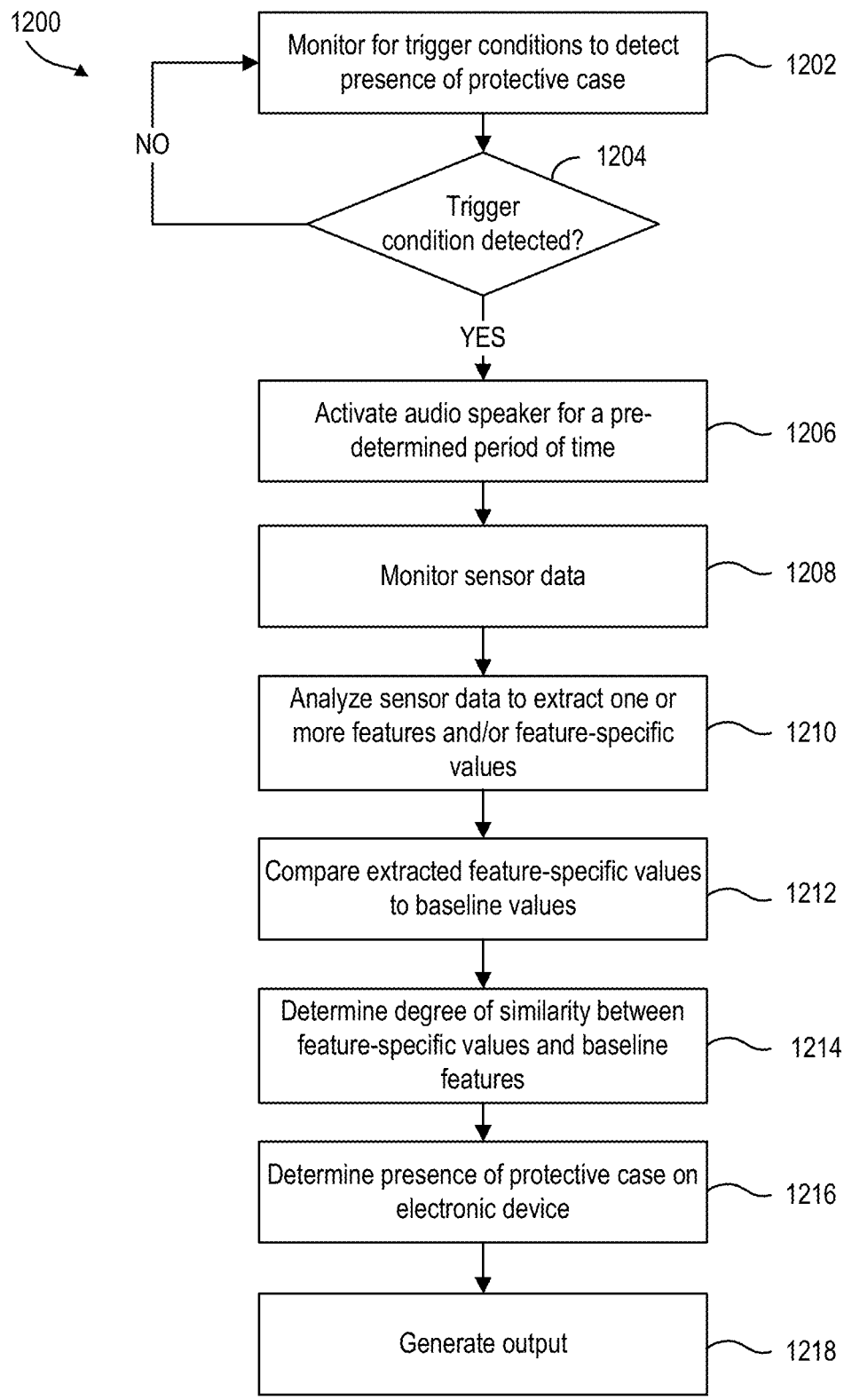
FIG. 12 is an example embodiment of a process flow for a method for automatically detecting the presence of a protective case on an electronic device where an audio tone is used to vibrate the electronic device.

Referring now to FIG. 12, there is shown an example embodiment of process flow for a method 1200 for automatically detecting the presence of a protective case 130 on the electronic device 100 by vibrating the device using an audio tone, rather than using the vibration device 208. The method 1200 can be performed, for example, by the processor 202 executing an case detection application 602 (e.g., sensor processing application 602b).

In particular, the method 1200 is generally analogous to method 900, with the exception that—at act 1206—vibration is not induced by a vibration device 208, but rather, is induced by generating an audio tone, i.e., via the audio speaker 210.

More specifically, at act 1206, the case detection application 602 can control the audio speaker 210 to generate an audio tone (e.g., a single frequency sine wave), having a pre-determined frequency (e.g., 100 Hz to 20 kHz), with the range of frequencies being limited only by the capabilities of the device's audio speaker 210. The audio speaker 210 is controlled, for example, based on a system call or an API call to the operating system. In some cases, more than one audio frequency is played (e.g., 100 Hz, 250 Hz, 440 Hz, 1 KHz and 10 KHz) for a pre-determined period of time (e.g., 1-5 seconds per frequency tone), at the maximum allowed volume of audio speaker 210. In some cases, generating more than one audio frequency may increase the accuracy of the system as relying on multiple frequencies allow for a wider array of possible extracted feature-specific values, and a greater ability to identify whether or not a protective case 130 is applied.

Similar to act 908 of FIG. 9, at act 1208, case detection application 602 can monitor sensor data generated by vibration of the device resulting from the one or more frequency audio tones. For example, the case detection application 602 can monitor three-axis linear acceleration data generated by an accelerometer, or three-axis rotational acceleration data generated by a gyroscope.

At act 1210, the sensor data is analyzed to extract one or more features, and feature-specific values. The determined feature-specific values are then compared to a baseline sensor dataset, which may be generated in a similar manner as described previously at acts 712 of FIG. 7 and act 912 of FIG. 9. Where more than one frequency audio tone is generated, features and feature-specific values can be extracted for each frequency tone, and compared to a corresponding baseline dataset for that specific frequency tone.

At acts 1212 and 1214, the feature-specific values are compared to the baseline datasets to classify—at act 1216—the sensor data as corresponding to a device with, or without, a protective casing. At act 1218, an output may then be generated, based on the comparison.

Figure 13:
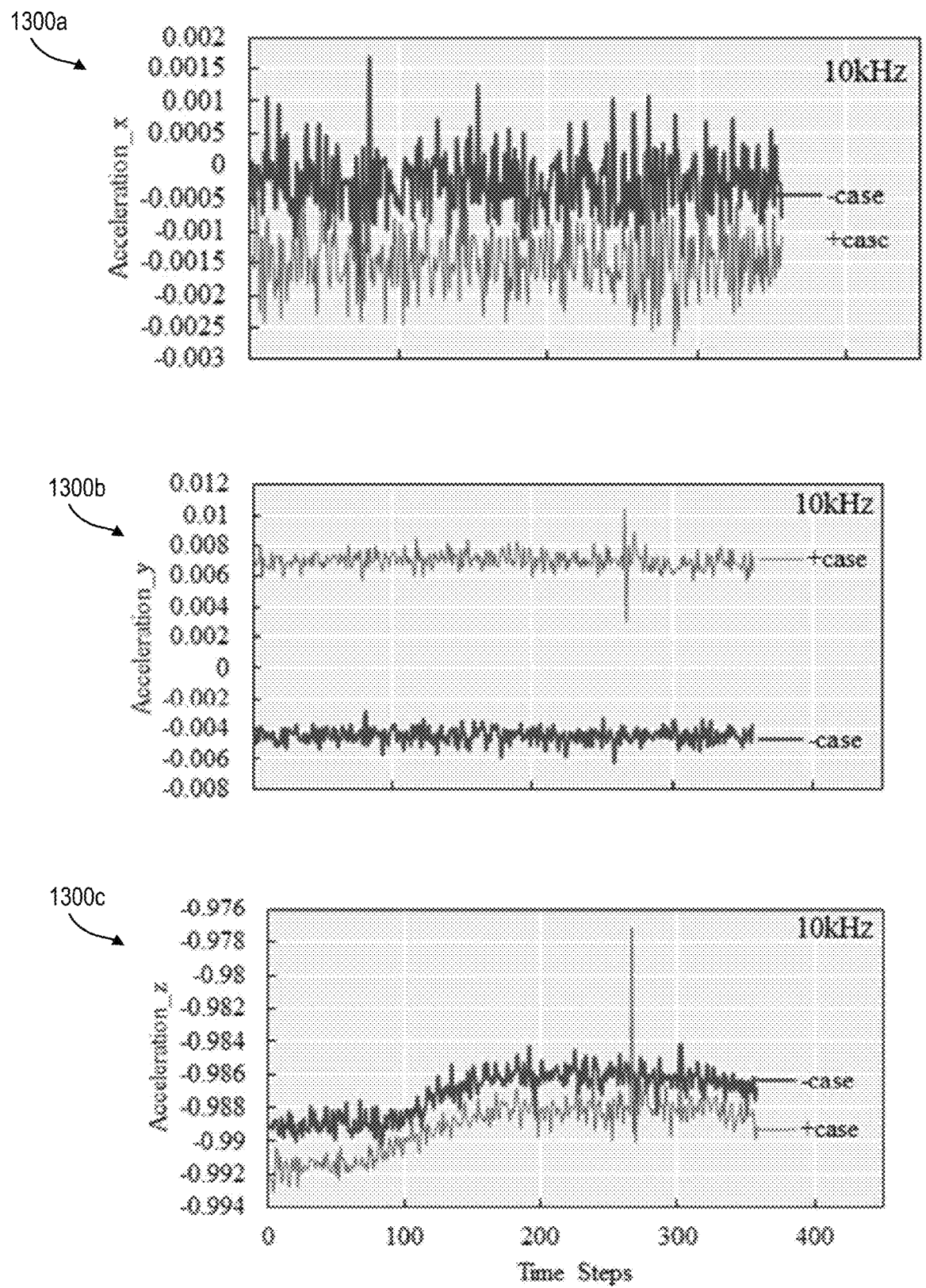
FIG. 13 shows plots for linear acceleration values—along the X, Y, and Z axes—obtained from a built-in accelerometer of an electronic device vibrating due to a 10 KHz audio tone, for both cases where a protective case is applied to the electronic device, and where no protective case is applied to the electronic device.
Figure 14:
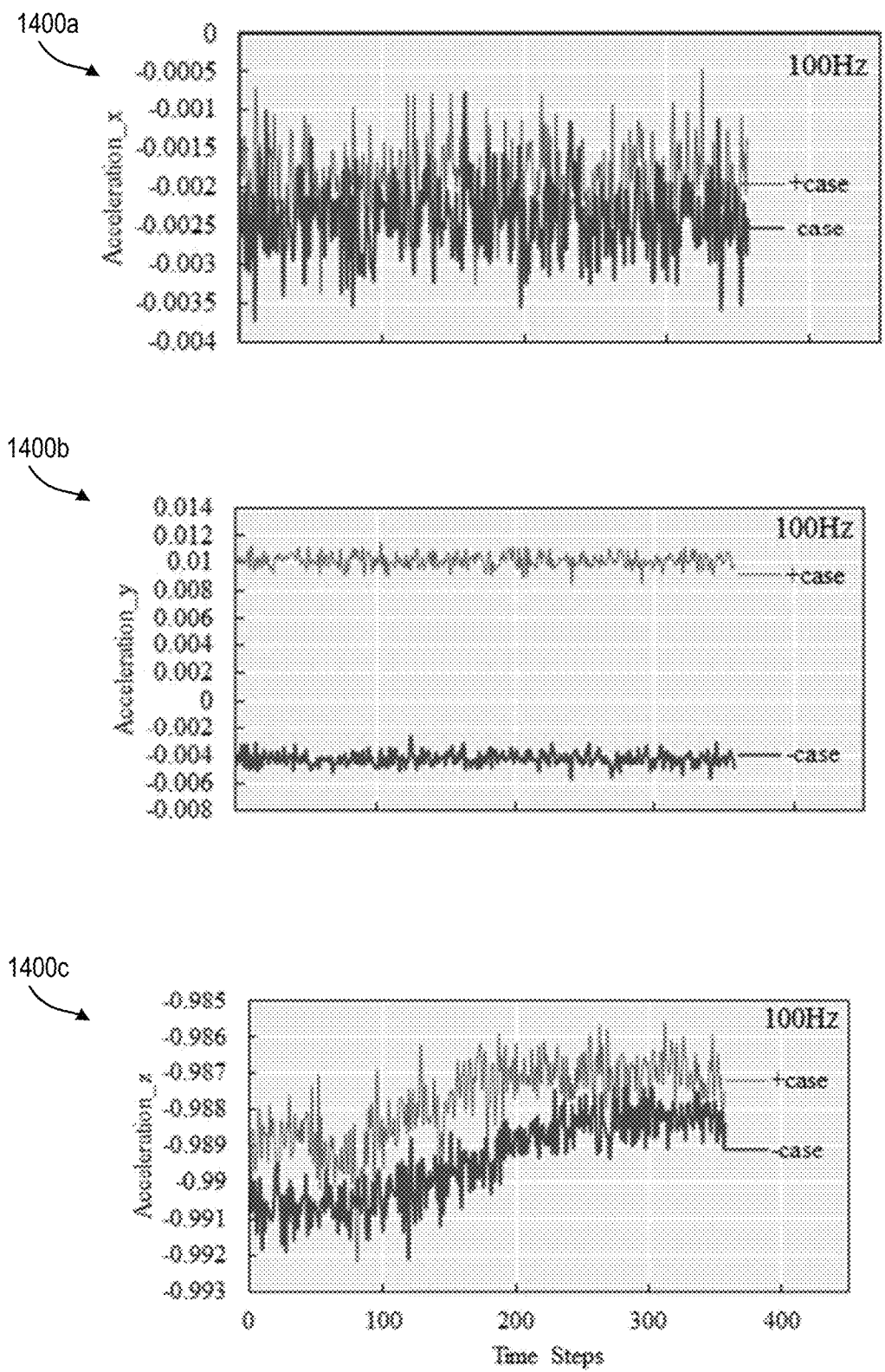
FIG. 14 shows plots for linear acceleration values—along the X, Y, and Z axes—obtained from a built-in accelerometer of an electronic device vibrating due to a 100 Hz audio tone, for both cases where a protective case is applied to the electronic device, and where no protective case is applied to the electronic device.

Referring now briefly to FIGS. 13 and FIG. 14. FIG. 13 shows example plots for baseline amplitude values—with and without a protective case 130—for acceleration data in the X-axis (plot 1300a), Y-axis (plot 1300b), and Z-axis (plot 1300c) resulting from vibration induced by a 10 KHz audio tone. FIG. 14 shows example plots for baseline amplitude values—with and without a protective case 130—for acceleration data in the X-axis (plot 1400a), Y-axis (plot 1400b), and Z-axis (plot 1400c) generated from vibration induced by a 100 Hz audio tone. As shown, in each case, the difference between the recorded acceleration values is most pronounced along the Y-axis. Further, the positive case (e.g., protective case 130) has a generally greater acceleration amplitude than the negative case (e.g., no protective case 130).

Figure 15A:
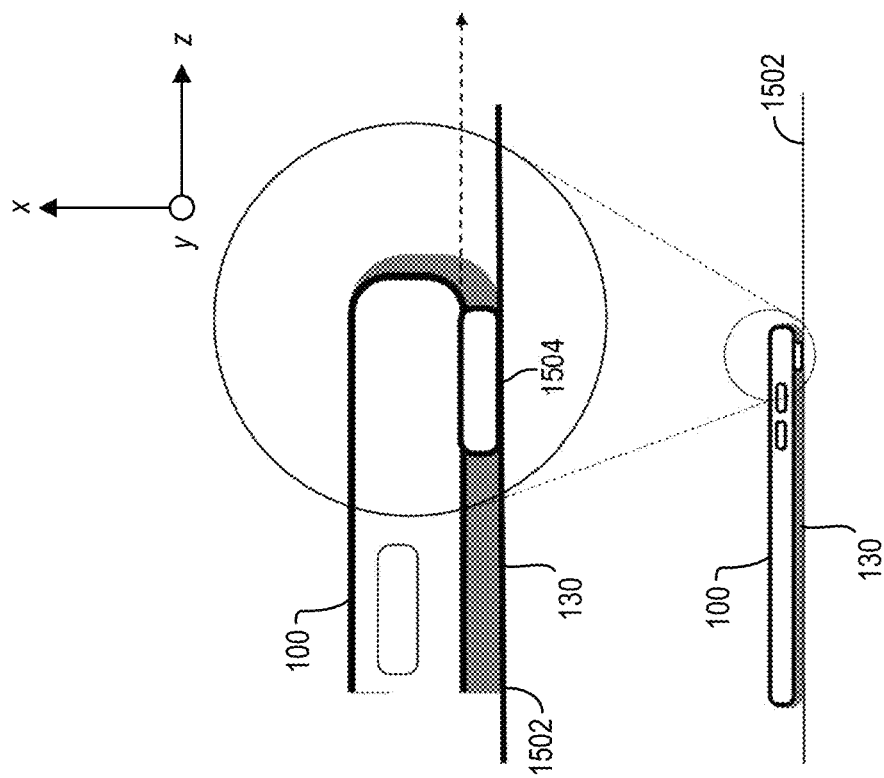
FIG. 15A schematically illustrates an example electronic device resting on a level surface, wherein the electronic device includes a protruding part, and no protective case is applied to the electronic device.
Figure 15B:
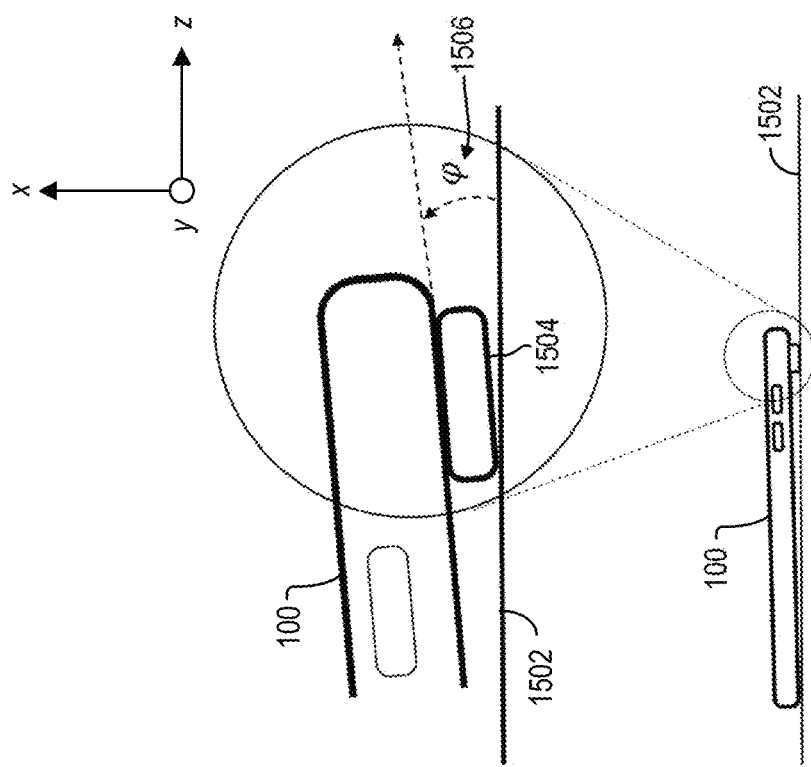
FIG. 15B schematically illustrates an example electronic device resting on a level surface, wherein the electronic device includes a protruding part, and a protective case is applied to the electronic device.

Referring now to FIGS. 15A and 15B. FIG. 15A illustrates an example electronic device 100, resting on a level surface 1502, without a protective case 130. FIG. 15B illustrates an example electronic device 100, resting on a level surface 1502, with a protective case 130.

As shown, electronic devices 100 often include one or more protruding parts—or otherwise—parts that extend beyond the enclosing body of the electronic device 100 (e.g., a protruding rear camera 1504). When the device is placed on a level surface, the protruding parts can tilt the electronic device 100 at an angled inclination, relative to the level surface. For example, as shown in FIG. 15A, an electronic device 100 without the protective case 130 sits at a tilt angle ((p) 1506 relative to the horizontal surface 1502. However, in many cases, when a protective case 130 has been applied to the device, the case may cover over the protruding part. For example, as shown in FIG. 15B, the protective case 130 can encapsulate the rear camera 1504, such that the device 100 now rests almost parallel to the surface 1502.

In view of the foregoing, it has been appreciated that determining whether or not a protective case 130 is applied to an electronic device 100 may be based on detecting the resting inclination or tilt of the device. Further, as provided herein, it has also been appreciated that various surrounding environmental parameters can also be monitored and measured, while the device is in a resting state, to determine the presence of a protective case 130.

Figure 16:
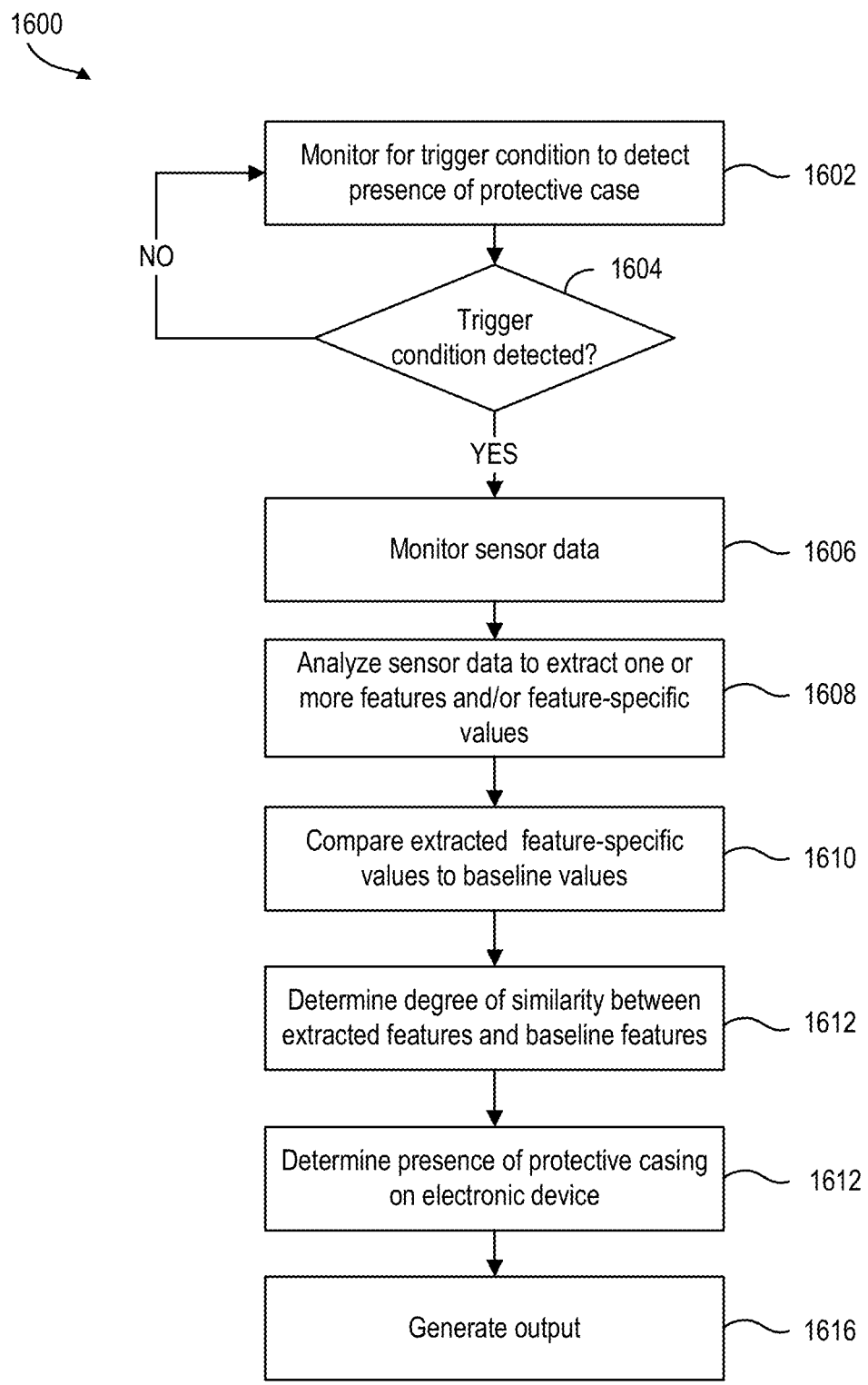
FIG. 16 is an example embodiment of a process flow for a method for automatically detecting the presence of a protective case on an electronic device based on monitored sensor data.

Referring now to FIG. 16, there is shown an example embodiment of a process flow for a method 1600 for automatically determining the presence of a protective case 130 based on monitored sensor data. The method 1600 can be performed, for example, by the processor 202 executing case detection application 602 (e.g., sensor processing application 602b).

In particular, the method 1600 is generally analogous to the method 900 of FIG. 9 and/or method 1200 of FIG. 12, with the exception that the method 1600 does not activate vibration device 208 or the audio speaker 210. Rather, at act 1606, responsive to detecting the trigger condition, the case detection application 602 automatically commences to monitor sensor data for a pre-determined time threshold (e.g., 1-5 seconds). For example, as shown in FIGS. 15A and 15B, the case detection application 602 can monitor accelerometer data to determine whether the device is tilted (i.e., inclined) on a level surface. In other cases, case detection application 602 can also monitor other sensor data, including temperature sensor data, light data, light sensor data, etc. For example, in various cases, optical (i.e., light) sensor data may be used to determine the presence of a protective case 130. In particular, the presence of a case may increase the distance between the electronic device 100 (e.g., the camera and flash components), and the resting surface, thereby varying optical surface reflection from activating the flash between cases where protection is, or is not present. Acts 1608 to 1616 of method 1600 are then generally analogous to acts 910 to 918 of method 900, or acts 1210 to 1218 of method 1200.

Figure 17:
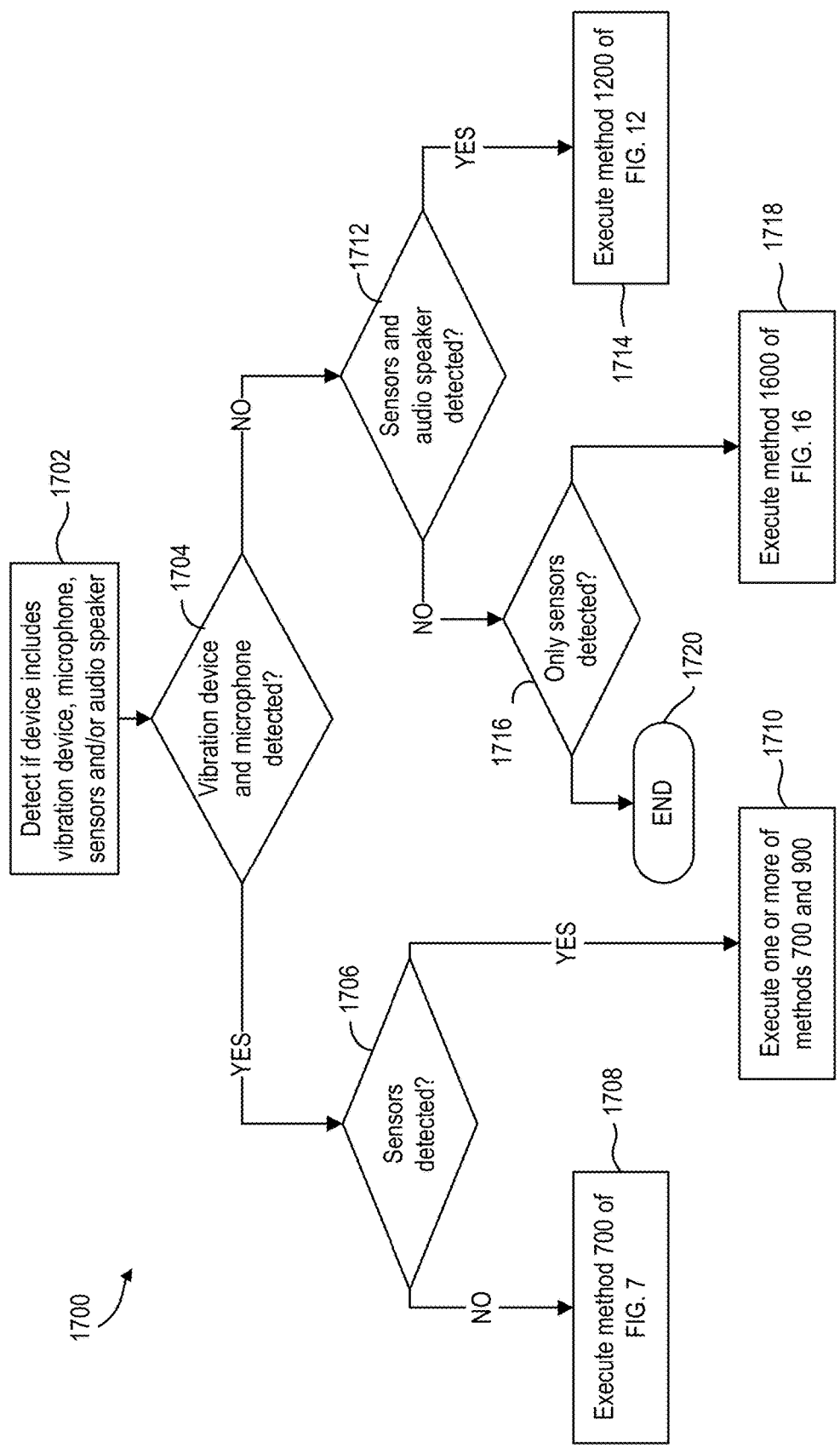
FIG. 17 is an example embodiment of a process flow for a method for automatically detecting the presence of a protective case on an electronic device, in accordance with the teachings provided herein.

Referring now to FIG. 17, there is shown an example embodiment for a process flow for a method 1700 for automatically detecting the presence of a protective case 130 on an electronic device 100. In particular, method 1700 provides for an integrated combination of method 700 of FIG. 7, method 900 of FIG. 9, method 1200 of FIG. 12 and method 1600 of FIG. 16.

In particular, as shown, at act 1702, the case detection application 602 can initially determine whether the electronic device 100 includes one or more of a vibration device 208, a microphone 212, an audio speaker 210 and/or sensors 214 (e.g., motion or orientation sensors). As provided herein, this determination can allow the case detection application 602 to determine which of methods 700, 900, 1200 or 1600 to use in detecting the presence of a protective case 130 on the electronic device 100.

In various embodiments, the determination at act 1702 is made—by the case detection application 602—via an API (Application Programming Interface) call, or system call, to the device. In particular, the API or system call can confirm that the electronic device 100 includes a vibration device 208, a microphone 212, an audio speaker 210 or one or more relevant sensors 214. Responsive to the API/system call, the operating system may return a Boolean response (true/false) in respect of each query for each system device. In other cases, the API/system call may simply provide a list of all supported features on the device 100. Accordingly, in these cases, the case detection application 602 can iterate over the returned list and compare each element of the list with the features of interest (e.g., a microphone, audio speaker and/or specific sensors), to determine if the features are supported. In this manner, the logic of the determination at act 1702 may vary based on the specification of the API provided by the corresponding device operating system.

Based on the sub-device component data received at act 1702, at act 1704, the case detection application 602 can initially determine whether the device includes at least a vibration device 208 and a microphone 212.

If so, at act 1706, the case detection application 602 can further determine—based on information received at act 1702—whether the device also includes relevant sensors (e.g., accelerometers and gyroscopes).

If not, at act 1708, the case detection application 602 can perform the method 700 of FIG. 7, using only the detected vibration device 208 and microphone 212 to detect the presence of a protective case 130 on the electronic device 100.

Otherwise, at act 1710, if both sensors and a microphone are detected, the case detection application 602 can perform one or more of method 700 of FIG. 7 (e.g., using the microphone 212), and method 900 of FIG. 9 (e.g., using the sensor data) to determine the presence of a protective case 130 through device vibration. In some cases, a combination of methods 700 and 900 can also be used to increase protective case detection accuracy. For example, a combination (e.g., weighted or unweighted) of the results of each method can be used to determine final output result.

At act 1704, if a microphone and vibration device are not detected—then at act 1712, the case detection application 602 can determine if sensors 212 and an audio speaker 210 are detected.

If so, at act 1714, the case detection application 602 can perform method 900 of FIG. 9 using the audio speaker 210 to induce device vibration, and the sensors 212 to detect the vibration and the presence of a protective case 130. Otherwise if no audio speaker is detected at act 1712, at act 1716, the case detection application 602 can further determine if the device includes at least one or more sensors 214. If so, the case detection application 602 can execute act 1718, wherein the method 1200 of FIG. 12 is performed using only position and/or environmental sensor data to detect a protective case 130. Otherwise, if no microphone, audio speakers or sensors are detected, the method can end at act 1720.

In the illustrated embodiment, the presence of the microphone, sensors and audio speaker is initially determined at act 1702. However, in other cases, this check can also be performed at the relevant act in method 1700. For example, the presence of the microphone may be confirmed at act 1704, and the presence of sensors may be separately confirmed at act 1706 and/or act 1712, as the case may be.

It will also be appreciated that the order of actions in method 1700 is only shown by way of example, and that the determinations at acts 1704, 1706, 1712 and 1716, can be performed in any other order while accomplishing the same result. For example, the case detection application 602 can first determine, at act 1704, whether the device includes one or more sensors, and then subsequently, at act 1706, determine whether the device additionally includes a microphone, etc.

In some embodiments, method 1700 is performed during an application initialization stage. For example, once the application is installed on the device (or anytime thereafter), the application may run a check in accordance with method 1700. Based on the check, the case detection application 602 may select the appropriate method for when a trigger condition is detected. In other cases, method 1700 can be performed only after a trigger condition is detected (e.g., act 704 in method 700, act 904 in method 900, act 1204 in method 1200 and/or act 1604 in method 1600).

Figure 18:
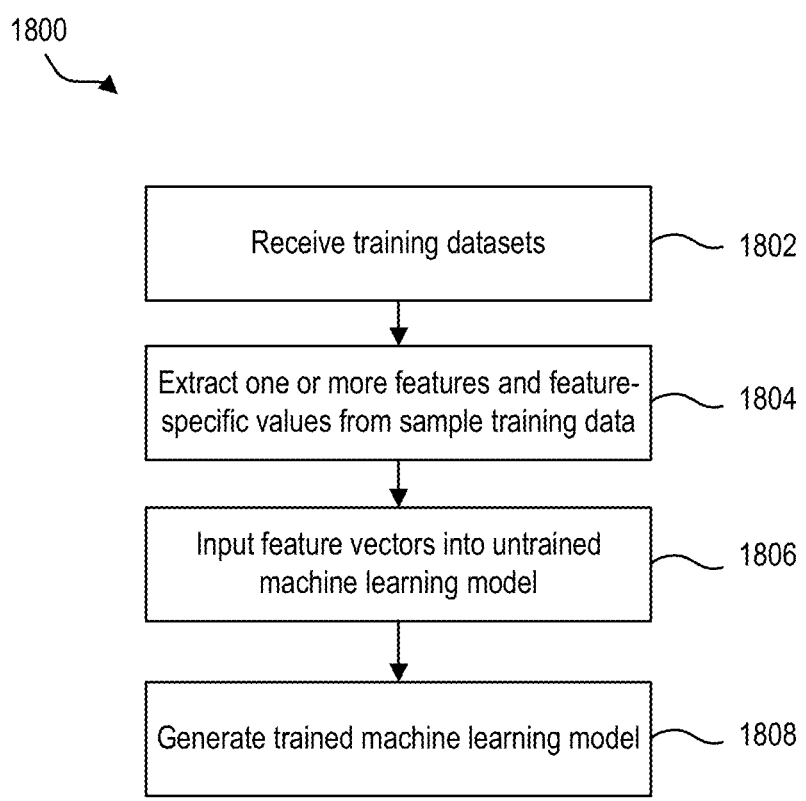
FIG. 18 is an example embodiment for a process flow for a method for training a machine learning model to automatically detect the presence of a protective case on an electronic device.

Referring now to FIG. 18, there is shown a method 1800 for training a machine learning model for detecting whether or not a protective case 130 is applied to an electronic device 100. In various cases, the trained machine learning model can be used to analyze features, and feature-specific values, extracted from sound data (FIG. 7) and/or sensor data (FIGS. 9, 12 and 16). For example, a trained machine learning model can be stored in memory 206, and used in place of acts 712-714 (FIG. 7), acts 912-914 (FIG. 9), acts 1212-1214 (FIG. 12) and acts 1610-1612 (FIG. 16) to determine the presence of a protective case 130. In various cases, a separate or single machine learning model can be generated for use in each of methods 700, 900, 1200 and 1600.

The method 1800 can be carried out, for example, by a case detection application 602 executing on a processor 202 of electronic device 100. In other cases, the method 1800 can be performed on an external/remote processor (e.g., an external server).

At act 1802, training datasets are received for training the machine learning model. In particular, training datasets used at act 1802 may be analogous to the baseline sound and/or sensor data previously described in relation to act 712 of method 700, act 912 of method 900, act 1212 of method 1200, and act 1610 of method 1600. That is, the training data can correspond to example sound and/or sensor data for cases where a protective case 130 is applied, or otherwise not applied. The type of training data used can depend on which of methods 700, 900, 1200 or 1600 the machine learning model is trained to execute. In various cases, a plurality of training datasets are generated, wherein each dataset corresponds to a different set of test conditions (i.e., as described previously in relation to generating baseline datasets) when a protective case was applied, or otherwise is not applied, to the electronic device 100.

In some cases, as previously explained, the sample training data (e.g., baseline data) may be pre-generated (e.g. by an application developer). For example, method 1800 may be performed remotely, off-line to generate trained machine learning models. Otherwise, as explained, the case detection application 602 may guide the user through the process of generating the baseline (or training) data on the device 100.

At act 1804, one or more features, and feature-specific values are extracted from the training data. For example, this is performed as previously explained in relation to act 710 of FIG. 7, act 910 of FIG. 9, act 1210 of FIG. 12, or act 1608 of FIG. 16.

At act 1806, feature vectors are generated based on the extracted feature-specific values. In particular, for each training dataset, a the feature vector can be generated that can include feature-specific value data (e.g., feature-specific values) extracted from features corresponding to that training dataset.

Each feature vector can also include a "label" indicating whether the extracted feature-specific values correspond to a training dataset that was generated by applying a protective casing, or no protective casing. The labelled feature vectors are then used to train the machine learning model to map between feature-specific values, and cases where a protective case 130 was applied or not applied.

At act 1808, a trained machine learning model is generated based on the input data (e.g., labeled feature vectors).

In various cases, to train the machine learning model, a supervised machine learning algorithm is applied. In particular, the supervised learning model can split the set of training data samples into two disjoint sets: the training set and the test set. The samples in the training set are given as input to the algorithm to develop the mathematical model, and the samples in the test set are then used to evaluate the developed model, e.g. evaluate what percentage of the samples in the test set, if the sample is given as input to the model, the model classifies the sample correctly. Techniques such as 10-fold cross validation can be used for this purpose. Accordingly, the trained machine learning model can then be used on training data, and can act as a binary classifier classify input sensors sample data into two mutually exclusive classes: with protective case 130 (positive class) and without protective case 130 (negative class).

Figure 19:
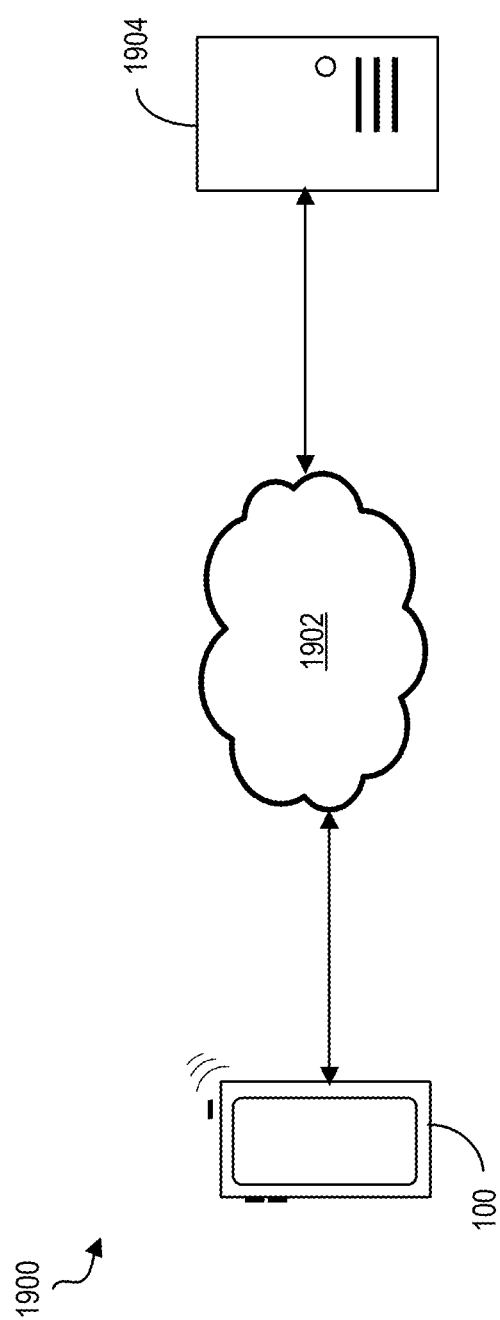
FIG. 19 is a simplified block diagram of an example system for detecting the presence of a protective case on an electronic device, in accordance with the teachings provided herein.

Referring now to FIG. 19, which shows a simplified block diagram of an example embodiment of a system environment 1900 for use in determining whether a protective case 130 is applied to an electronic device 100.

As shown, the system 1900 includes the electronic device 100 which is connected, via network 1902 to a remote server 1904. The server 1904 may include a server processor coupled to a server memory and/or a server communication interface (not shown). While the server 1904 is shown as a physical device, it will be appreciated that the server 1904 may be a cloud server. It will also be appreciated that while only a single server 1904 is illustrated, the system 1900 can include more than one server.

In some embodiments, the server memory may store a software program, which when executed by the server processor, is configured to—at least partially—execute any one of the methods provided herein (e.g., method 700, 900, 1200 and/or 1600).

For example, in some cases, the server 1904 can receive—via network 1902—sound and/or sensor data in real-time, or near real-time, from device 100. For example, the electronic device 100 may automatically—or upon request from the server 1904—transmit sound and/or sensor data via communication interface 204 after detecting a trigger condition. The data may then be received by the server's communication interface, via network 1902. Based on the received data, the server 1904 may perform acts 710-718 of FIG. 7, acts 910 — 918 of FIG. 9, acts 1210-1219 of FIG. 12, acts 1608-1616 of FIG. 16.

In other cases, the server 1904 may simply receive the output of each of methods 700, 900, 1200 and/or 1600. In some embodiments, the server 1904 may be associated with a warranty provider, and accordingly, the received outputs can be used to validate a warranty claim.

In other embodiments, the server 1904 can be used to host a trained a machine learning model (e.g., method 1800 of FIG. 18), which can be used to determine the presence of a protective case 130 on a device based on received sound and/or sensor data. In other cases, the trained machine learning model can be pushed (e.g., transmitted) to one or more electronic devices for storage on device memory 206. For example, server 1904 may update and refine the model based on collective (e.g., aggregated) data and outputs received from a plurality of electronic devices, and may occasionally transmit the updated models to one or more devices 100 for use in determining the presence of a protective case 130.

Network 1902 may be connected to the internet. Typically, the connection between network 1902 and the Internet may be made via a firewall server (not shown). In some cases, there may be multiple links or firewalls, or both, between network 1902 and the Internet. Some organizations may operate multiple networks 1902 or virtual networks 1902, which can be internetworked or isolated. These have been omitted for ease of illustration, however it will be understood that the teachings herein can be applied to such systems. Network 1902 may be constructed from one or more computer network technologies, such as IEEE 802.3 (Ethernet), IEEE 802.11 and similar technologies.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. An electronic device for detecting the presence of a protective case on the electronic device, the electronic device comprising:
one or more sensors;
a device memory storing an application including programs instructions for performing a method for detecting the presence of the protective case;
a device processor coupled to the device memory and the one or more sensors, the device processor, upon execution of the application, being configured to:
monitor, via at least one first sensor of the one or more sensors, a trigger condition for detecting the presence of the protective case;
detect the trigger condition;
in response to detecting the trigger condition, cause the electronic device to vibrate for a pre-determined period of time;
collect, via at least one second sensor of the one or more sensors, sensor data during the pre-determined time;
extract at least one feature from the sensor data;
based on the extracted at least one feature, determine whether the protective case is applied to the electronic device; and
generate an output indicating whether the protective case is applied to the electronic device.

2. The electronic device of claim 1, wherein the trigger condition comprises detecting a sensor value, generated by the at least one first sensor, that is greater than a pre-determined sensor value threshold.

3. The electronic device of claim 1, wherein the electronic device further comprises a vibrating device, and causing the device to vibrate comprises activating the vibrating device.

4. The electronic device of claim 1, wherein the electronic device further comprises an audio speaker, and when the electronic device is caused to vibrate the device processor further activates the audio speaker to emit an audio tone.

5. The electronic device of claim 1, wherein the at least one first sensor comprises one or more of an accelerometer and a gyroscope, and the at least one second sensor comprises one or more of an accelerometer, gyroscope and microphone.

6. The electronic device of claim 1, wherein the extracted feature comprises at least one of amplitude, frequency, energy and a Fast Fourier Transform (FFT) of the sensor data.

7. The electronic device of claim 1, wherein the device processor is further configured to determine, for each extracted feature, one or more feature-specific values.

8. The electronic device of claim 7, wherein determining whether the protective case is applied to the electronic device comprises comparing the one or more feature-specific values to at least one of baseline feature-specific values corresponding to a positive case indicating a presence of a protective case, and baseline feature-specific values corresponding to a negative case indicating an absence of a protective case.

9. The electronic device of claim 8, wherein the comparing comprises determining a similarity measure between the one or more feature-specific values to at least one of the positive case and negative case baseline feature-specific values.

10. The electronic device of claim 1, wherein determining whether the protective case is applied to the electronic device comprises inputting the one or more feature-specific values into a trained machine learning model.

11. A method for detecting the presence of a protective case on an electronic device, the method comprising:
monitor, via at least one first sensor of the one or more sensors of the electronic device, a trigger condition for detecting the presence of the protective case;
detect, via a device processor of the electronic device, the trigger condition;
in response to detecting the trigger condition, cause the electronic device to vibrate for a pre-determined period of time;
collect, via at least one second sensor of the one or more sensors of the electronic device, sensor data during the pre-determined time;
extract, using the device processor, at least one feature from the sensor data;
based on the extracted at least one feature, determine, using the device processor, whether the protective case is applied to the electronic device; and
generate, using the device processor, an output indicating whether the protective case is applied to the electronic device.

12. The method of claim 11, wherein the trigger condition comprises detecting a sensor value, generated by the at least one first sensor, that is greater than a pre-determined sensor value threshold.

13. The method of claim 11, wherein causing the electronic device to vibrate for a pre-determined period of time comprises activating a vibration device of the electronic device.

14. The method of claim 11, wherein causing the electronic device to vibrate for a pre-determined period of time comprises activating an audio speaker of the electronic device to emit an audio tone.

15. The method of claim 11, wherein the at least one first sensor comprises one or more of an accelerometer and a gyroscope, and the at least one second sensor comprises one or more of an accelerometer, gyroscope and microphone.

16. The method of claim 11, wherein the extracted feature comprises at least one of amplitude, frequency, energy and a Fast Fourier Transform (FFT) of the sensor data.

17. The method of claim 11, wherein the method further comprises determining, using the device processor, for each extracted feature, one or more feature-specific values.

18. The method of claim 17, wherein determining whether the protective case is applied to the electronic device comprises comparing, using the device processor, the one or more feature-specific values to at least one of baseline feature-specific values corresponding to a positive case indicating a presence of a protective case, and baseline feature-specific values corresponding to a negative case indicating an absence of a protective case.

19. The method of claim 18, wherein the comparing comprises determining, using the device processor, a similarity measure between the one or more feature-specific values to at least one of the positive case and negative case baseline feature-specific values.

20. The method of claim 11, wherein determining whether the protective case is applied to the electronic device comprises inputting the one or more feature-specific values into a trained machine learning model stored on a device memory of the electronic device.

\* \* \* \* \*